June 20, 1967 K. G. ÅHLÉN 3,326,061
HYDRODYNAMIC TRANSMISSION
Filed July 6, 1964 20 Sheets-Sheet 7

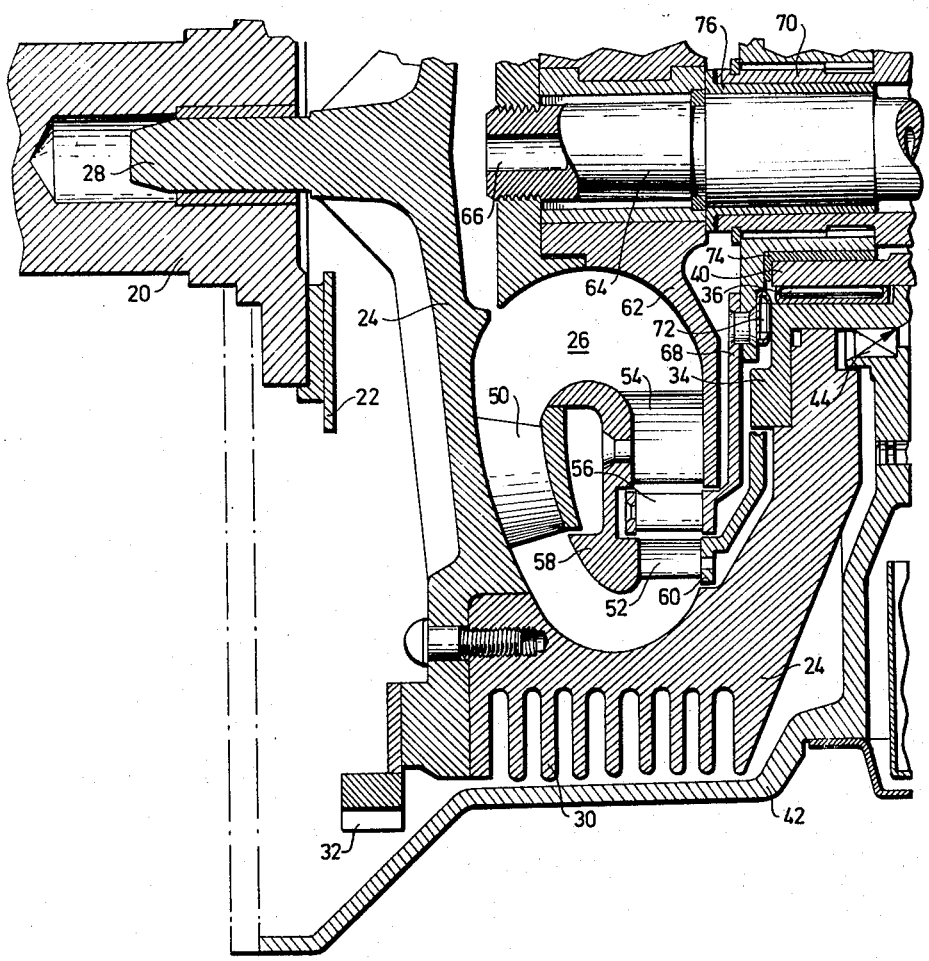

3,326,061
HYDRODYNAMIC TRANSMISSION

Karl Gustav Åhlén, Stockholm, Sweden, assignor, by mesne assignments, to S.R.M. Hydromekanik Aktiebolag, Stockholm, Sweden, a joint-stock company of Sweden Filed July 6, 1964, Ser. No. 380,540
Claims priority, application Sweden, July 4, 1963,
7,416/63
31 Claims. (Cl. 74—688)

The present invention has as an end to create a hydrodynamic transmission particularly intended for power transmission in small passenger cars.

During these years the demand for a hydrodynamic transmission for small motor vehicles has increased bit by bit, mostly on account of the increasing traffic in populous regions. It has thereby appeared that a small car can, thanks to its handiness, keep a higher speed in the thick urban traffic than big cars, which has made it more attractive also to those customers who can and will pay for performance. To further raise the value of those small vehicles it is desirable to improve their acceleration characteristics and ability to keep a high mean speed in thick traffic. This can be arranged in two ways viz, by increasing the engine power and by improving the gear device. With a hydrodynamic transmission according to the present invention instead of the conventional mechanical gear box there is a possibility with unchanged engine power and maximum speed to increase the mean speed by 10–20% at a high stopping and starting frequency. To obtain the corresponding increase of the mean speed with a conventional mechanical gear box it would be necessary to increase the engine power with 20–40%. There is thus a margin for the increase of costs for a gear device with such performance that can otherwise be obtained only by an increase of the engine power, at least if it is not at the same time demanded that the tractive force is varied absolutely without shocks, which is not the case with conventional gear boxes, as is known.

The present invention will through a drastic exploitation of a few elements give a sufficiently cheap design of a hydrodynamic transmission for small private cars without reducing the tractive force, fuel economy and increase of the mean speed as compared with a conventional gear box, but with a certain relinquishment of the continuous variation of the tractive force over the whole speed range, i.e. in reality the variation of the tractive force without any variation by steps of the engine speed, in comparison with the existing more expensive and complicated hydrodynamic transmissions.

There is, however, a possibility to get the tractive force working without shocks by abandonment of the reached simpleness also at continuous acceleration, which is not possible even with the most expensive designs of the already existing hydrodynamic transmissions. The hitherto known types of hydrodynamic transmissions are also such that the size of series necessary for obtaining acceptable costs for each transmission unit with the necessary investment of tools has been too large to make them attractive for use in small cars.

The present invention is principally based on a combination between a planetary gear connecting the turbine blade and reaction blade members of a hydrodynamic torque converter for rotation of them in the same direction at at least one certain speed ratio on one hand, and on the other hand connection devices between said members and a propeller shaft, whereby the power flow in said planetary gear varies between different connecting conditions. When the planetary gear is designed as a compound gear giving several different predetermined speed ratios between the turbine and the reaction members, it will furthermore be possible in a simple and cheap way to increase the variation possibilitites and performance for the gear device. A further improvement of the invention comprising a counter-rotation stage between the turbine and reaction members gives also the above mentioned variation of the tractive force without shocks over the whole speed range at continuous acceleration.

The present invention also shows a new feature, which is applicable for all hydraulic transmissions of the type forming a combination between a hydrodynamic torque converter and one or more pressure fluid operated servo-motors for changings over within transmissions between different running conditions. With all such transmissions it is a known difficulty to obtain sufficiently quick changes between the different servo-motors at idling speed on the primary side without at the same time to obtain too big losses in the units producing pressure liquid at high primary speeds. Hitherto servo-motors with differential pistons or different pressure fluid sources for the working chamber of the hydrodynamic torque converter and the servo-motors have often been used for this purpose. These solutions, however, have not given sufficiently quick changes or they have caused such great losses at high primary speeds that the efficiency at partial load has become very bad. Since the engine as a rule is not made full use of in small vehicles such as private cars, and since the mean speed is high, the applied solutions have led to a relatively large increase of the fuel consumption.

The present invention has solved this problem by using a pump with variable capacity driven from the primary side for the supply of pressure liquid to the hydraulic circuit to hold the basic pressure and to the servo-motors for filling and holding purposes which pump type has solved the problem to get enough capacity at low primary speed and to limit the power consumption at high primary speed. By keeping the capacity practically constant from idling speed to maximum speed on the primary shaft a very considerable reduction of the power consumption of the pump at high speed. In an application where the engine has an idling speed of 400 r.p.m. and a maximum speed of 4000 r.p.m. a saving of power of up to 80% can be obtained during normal drive conditions. With a pump arrangement of this type the efficiency of the engine transmission combination can at mean running conditions for a private car be increased with about 20% in comparison with an engine transmission combination having a pump of conventional type which also means a decrease of the fuel consumption of about 20%.

A further improvement can be obtained by combination of two pumps both driven from the primary side which combination requires a further decrease of the power consumption. The two pumps comprise a low pressure pump of the variable capacity type which has a large maximum capacity and a high pressure pump which has a small capacity. The low pressure side of the high pressure pump is connected with the high pressure side of the low pressure pump. A valve is also used for feeding the high pressure side of the high pressure pump from the low pressure pump when the capacity of the high pressure pump is too small for filling a servo-motor during shifting operation and another valve is used to return pressure liquid from the high pressure side of the high pressure pump to the low pressure side thereof when the desired pressure for holding the servo-motors has been obtained. The low pressure pump is thus used for holding the basic pressure in the hydraulic circuit, for filling the servo-motors during shifting, and for delivering a considerable input pressure to the high pressure pump which is only used for getting and holding the high pressure in the servo-motors. The high pressure pump can thus be designed with a very small capacity and a corresponding small power consumption at the same time as the areas and thus the volumes of the servo-motors can be kept low which in its turn gives very short times for shifting.

The details of the present invention will be illustrated by the following detail description of a number of suitable embodiments shown in the attached drawings, in which FIG. 1 shows a longitudinal section through a first embodiment of a transmission according to the present invention taken on a line 1—1 of FIG. 2.

Figure 1:
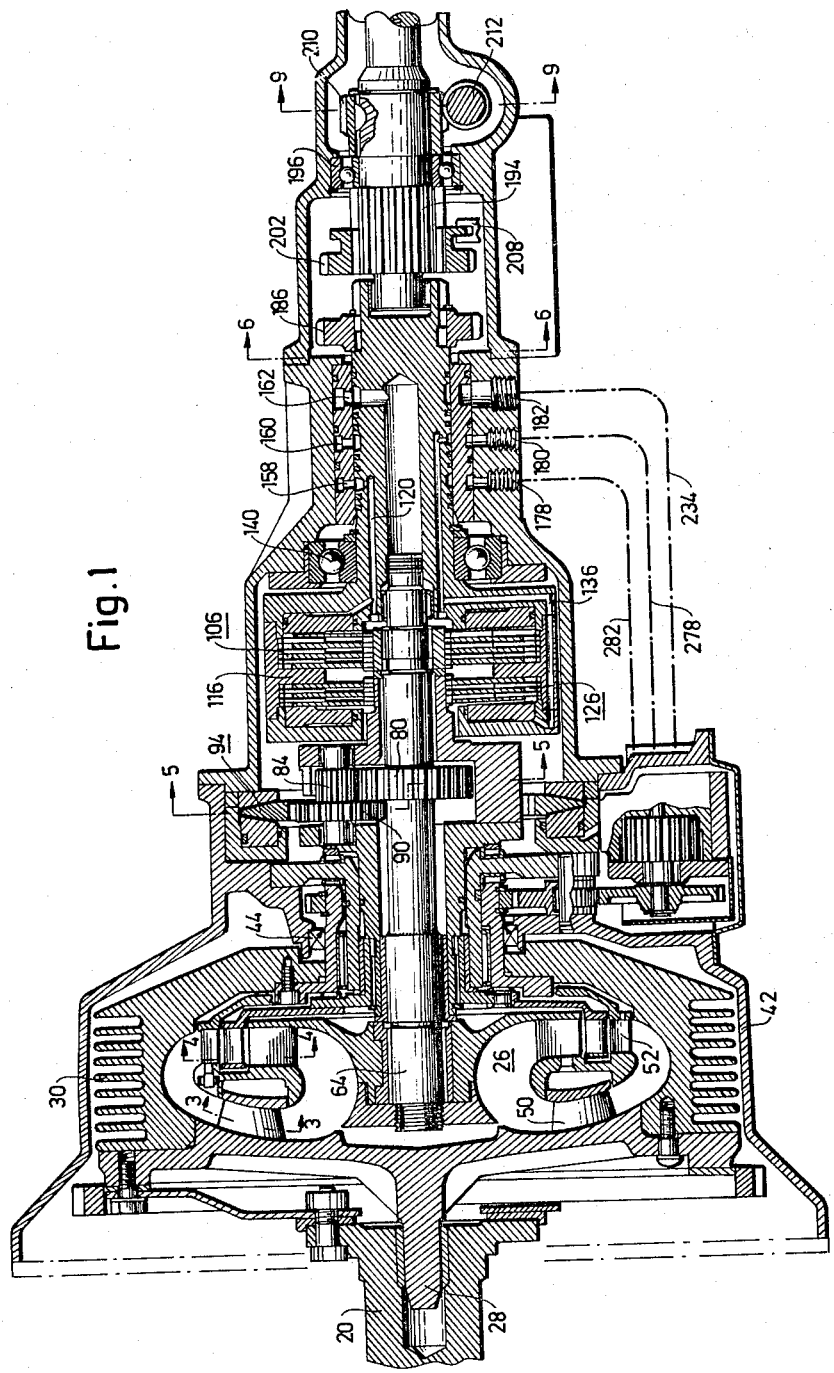
FIGS. 1a, 1b and 1c show different details of FIG. 1 on a larger scale.
Figure 1B:
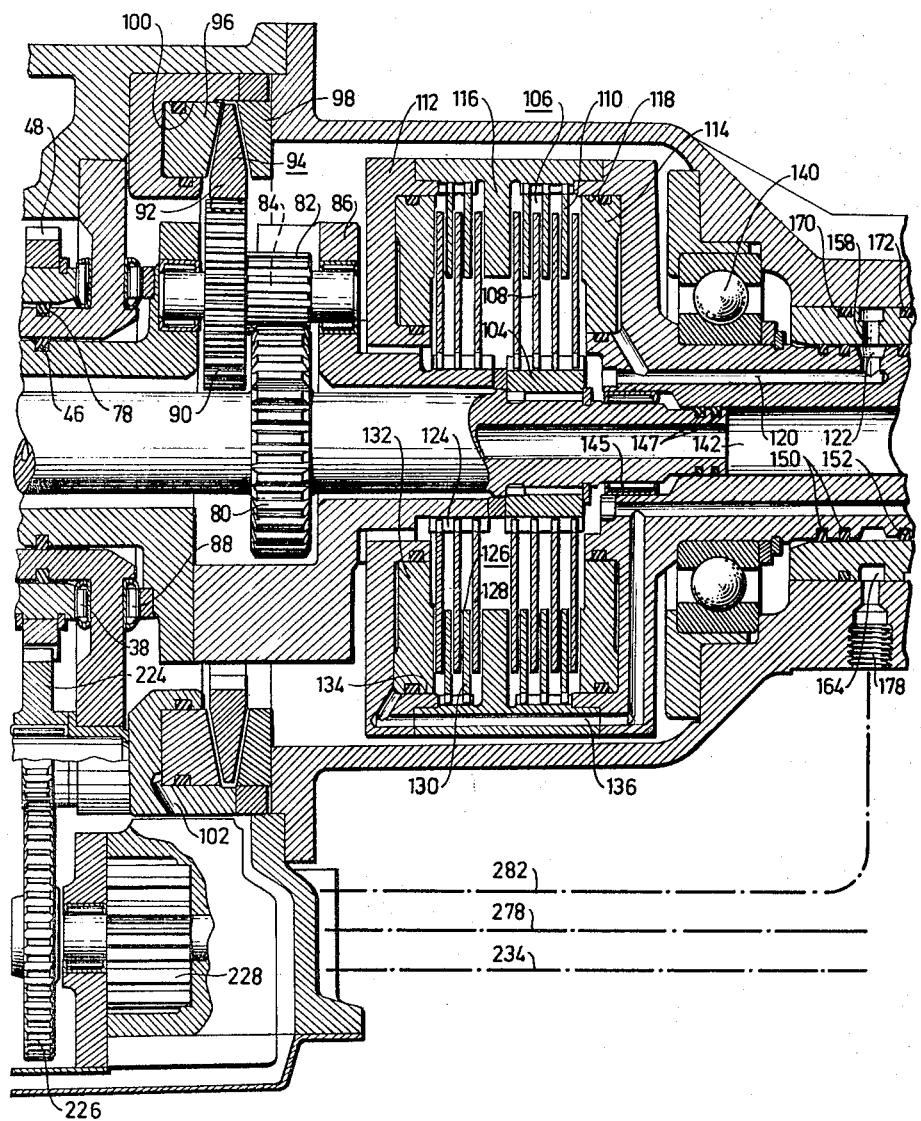
Figure 1C:
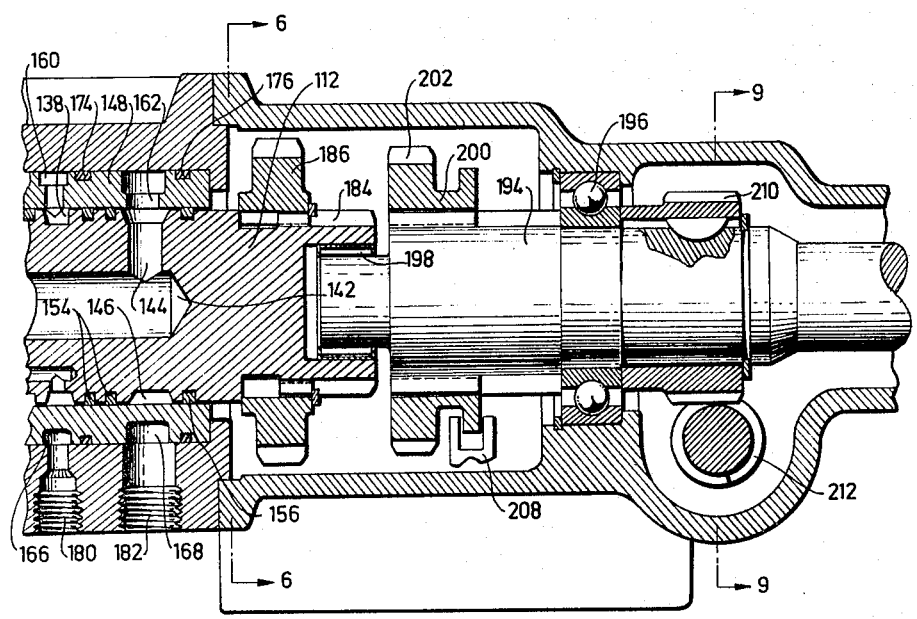
Figure 2:
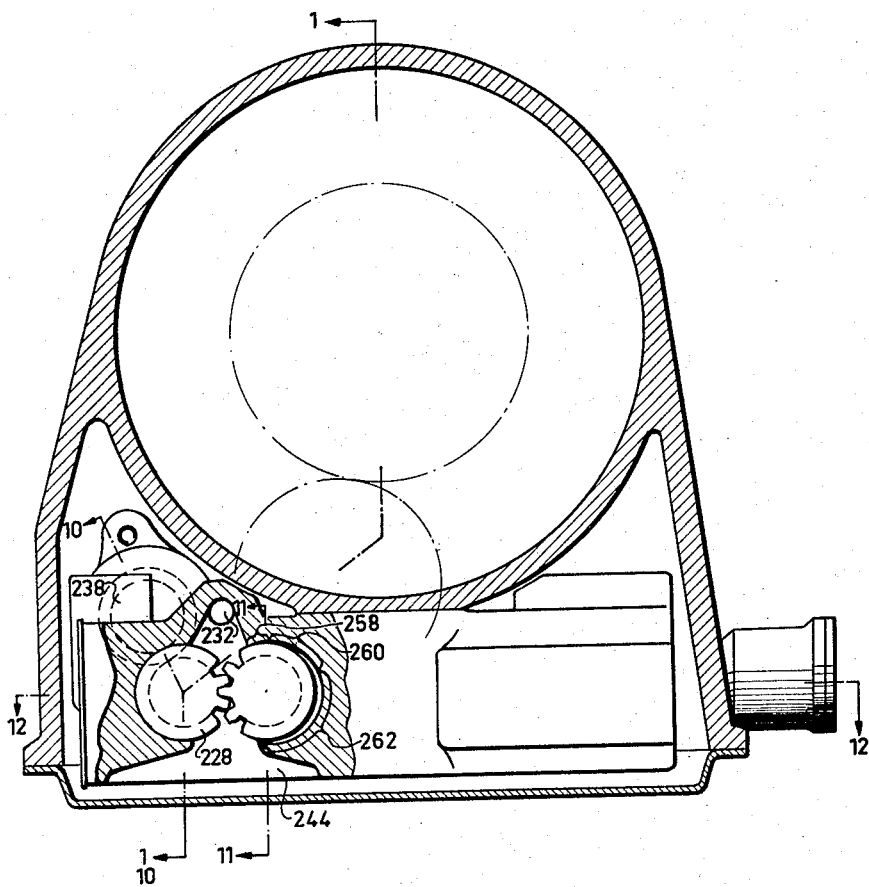
FIG. 2 shows a cross section of the transmission of FIG. 1 taken on a line 2—2 of FIG. 1.
Figure 4:
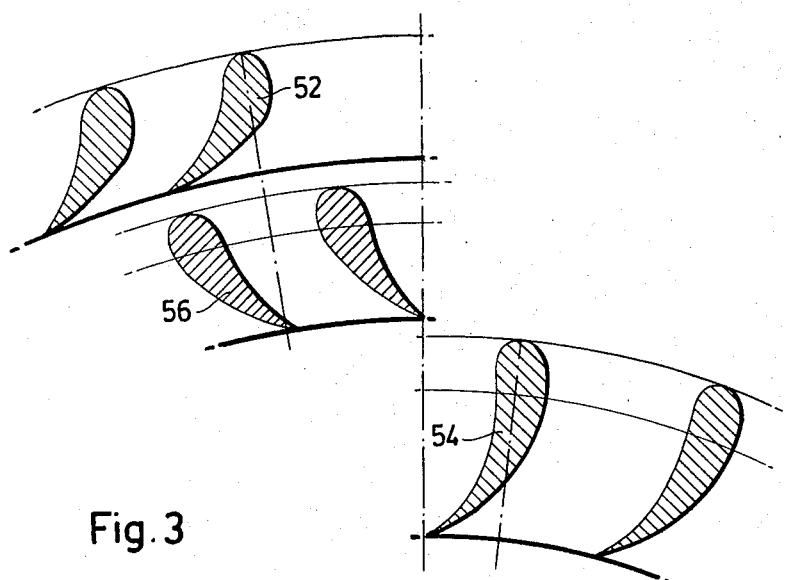
FIG. 4 shows a cross section through the turbine and reaction blades taken on a line 4—4 of FIG. 1.
Figure 3:
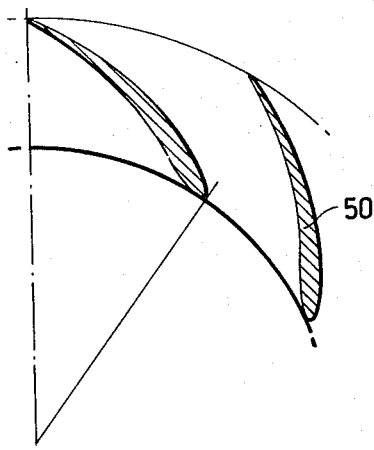
FIG. 3 shows a cross section through the pump blades taken on a line 3—3 of FIG. 1.

In the embodiment shown in FIGS. 1–13 a driving shaft 20 forms the shaft of an engine, not shown. This shaft 20 is by means of an axially resilient clutch disk 22 connected with the rotating casing 24 of a hydrodynamic torque converter provided with a torus-shaped working chamber 26 filled with a working liquid under pressure. The casing 24 is provided with a stub shaft 28 mounted in bearings in the shaft 20, with cooling flanges 30, with a gear ring 32 for co-operation with a gear of a starter, not shown, and a second shaft 34, which is tubular shaped and via a radial bearing 36 of needle bearing type and a thrust bearing 38 mounted to a tubular part 40 of a stationary casing 42 surrounding the torque converter. The shaft 34 furthermore cooperates with sealings 44 and 78 arranged outside and inside the shaft, respectively, for sealing against the stationary casing 42 and the tubular part 40. The seal 78 is of piston ring type. On the shaft 34 is also a gear ring 48 arranged, which is provided to drive a pump and a control device, as will be described later on.

The rotating casing 24 has also a ring of pump blades 50 stationarily fastened thereto and located in the torus-shaped working chamber 26. (See also FIG. 3.) In the working chamber 26 are further provided two rings of turbine blades 52 and 54 and a ring of reaction blades 56 (see also FIG. 4). The two rings of turbine blades 52 and 54 are interconnected through a part 58 forming the main part of a core located in the working chamber 26. The turbine blades 52 are also connected with a plate 60 sealing against the casing 24, which takes up a part of the axial pressure from the working fluid. The turbine blades 54 are supported by a turbine disk 62 forming a part of the wall of the working chamber 26 and which is fixed to a turbine shaft 64 with a central bore 66 for the supply of the working fluid. The reaction blades 56 are supported by a plate 68 which is fixed to a tubular reaction shaft 70, arranged between the turbine shaft 64 and the tubular part 40 of the stationary casing 42. The reaction plate 68 rests over a thrust bearing 72 against the rotating casing 24. Furthermore bearings 74 and 76 are provided between the reaction shaft 70 and the stationary tubular part 40 and between the turbine shaft 64 and the reaction shaft 70, respectively. The reaction shaft 70 is also provided with a seal 46 of piston ring type against the stationary tubular part 40. Of the different blades 50, 52, 54 and 56 in the working chamber 26 the pump blades 50 are located in a channel formed between the wall and the core of the working chamber through which channel the working fluid is flowing substantially outwards, and the turbine blades 52 and 54 as well as the reaction blades 56 are located in a second channel formed between the wall and the core of the working chamber through which channel the working fluid is flowing substantially radially inwards. The reaction blades 56 are located between the two rings of turbine blades 52 and 54 in such a way that the intake edges of the reaction blades lie radially inside the radially outermost parts of the core.

Figure 5:
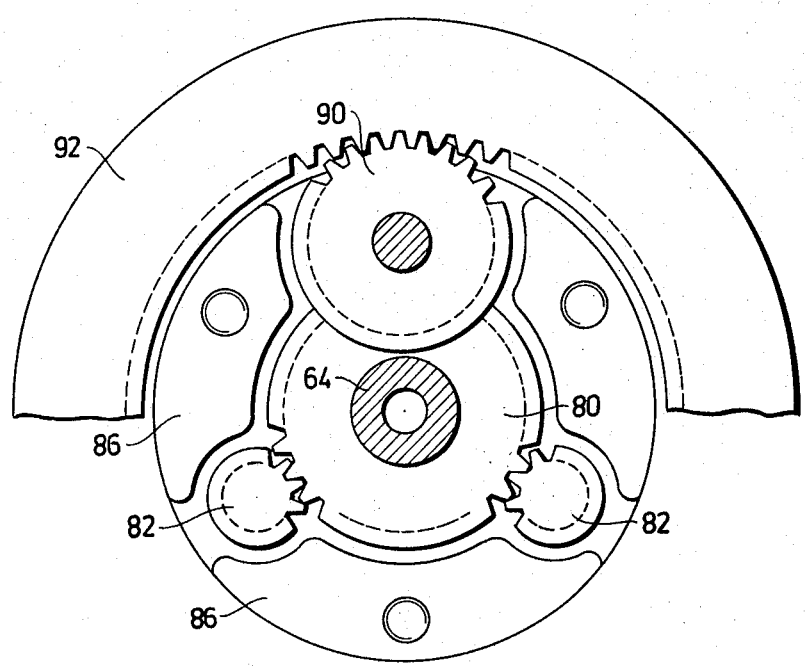
FIG. 5 shows a cross section through the planetary gear taken on a line 5—5 of FIG. 1.
Figure 11:
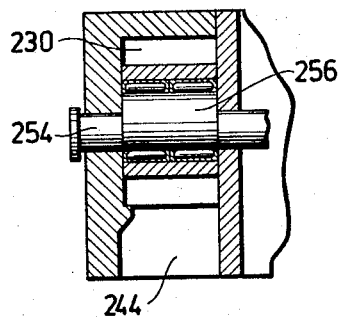
FIG. 11 shows a section taken on a line 11—11 of FIG. 2.

The part of the turbine shaft 64 projecting from the working chamber 26 is provided with a gear ring 80 forming the sun wheel of a planetary gear and being in continuous intermesh with a rim 82 of each of a number of planets 84, which are mounted in bearings in a planet carrier 86, which is non rotatably connected with the reaction shaft 70 and over a thrust bearing 88 rests against the stationary casing 42 (see also FIG. 5). Each planet is provided with a second rim 90 being in continuous intermesh with a ring gear 92. The ring gear is at its outer side provided with a circular braking disk provided with two conical contact surfaces. Said ring gear forms together with a hydraulically operated piston 96 located in the stationary casing 42 and provided with a conical contact surface, and a stationary portion 98 also provided with a conical contact surface a brake 94 for the ring gear. The piston 96 is axially movable in an annular chamber 100, which is open in an axial direction, and provided with a channel 102 for supply of pressure fluid.

The turbine shaft 64 carries also the primary part 104 of a first disk clutch 106. On the primary part 104 a number of clutch disks 108 are non rotatably mounted, which clutch disks cooperate with a number of corresponding clutch disks 110 supported by a propeller shaft 112. In the propeller shaft 112 is mounted a first hydraulically operated piston 114 as well as a fixed portion 116. The piston is axially movable in a direction towards the portion 116 in an annular chamber 118 open in an axial direction, which chamber communicates with a channel 120 in the propeller shaft 112 for supply of pressure fluid. The other end of the channel 120 communicates with a first annular groove 122 in the outer surface of the propeller shaft 112.

The planet carrier 86 and consequently the reaction shaft 70 carries the primary part 124 of a second disk clutch 126. On the primary part 124 a number of clutch disks 128 are non rotatably mounted, which clutch disks cooperate with a number of corresponding clutch disks 130 supported by the propeller shaft 112. In the propeller shaft 112 is a second hydraulically operated piston 132. The piston 132 is axially movable in a direction towards the portion 116 in an annular chamber 134 open in an axial direction, which chamber communicates with a channel 136 in the propeller shaft 112 for supply of pressure fluid. The other end of the channel 136 communicates with a second annular groove 138 in the outer surface of the propeller shaft 112.

The propeller shaft 112 is mounted in the stationary casing 42 by means of a ball bearing 140 and is provided with a central bore 142 open towards the torque converter, which bore through a radial bore 144 communicates with a third annular groove 146 in the outer surface of the propeller shaft 112. The turbine shaft 64 enters the bore 142 of the propeller shaft, so that the bore 66 communicates with the bore 142 and the turbine shaft 64 is by a needle bearing 145 mounted in the propeller shaft 112. A piston ring seal 147 is provided between the outer surface of the turbine shaft 64 and the barrel wall of the bore 142. The part of the propeller shaft 112 having the three annular grooves 122, 138 and 146 is surrounded by a bushing 148 non rotatably connected with the stationary casing 42 and sealed against the bushing by piston ring seals 150, 152, 154 and 156 located on both sides of each of the three grooves 122, 138 and 146. These seals 150, 152, 154 and 156 are made of Teflon-impregnated rings making it possible to obtain the necessary sealing with a simple arrangement in spite of the high pressures. Alternatively, the seals can be made as balanced piston rings.

The bushing 148 has three radial bores 158, 160 and 162, each of them communicating with one of the three grooves 122, 138 and 146. In the outer surface of the bushing there are also three annular grooves 164, 166 and 168, each of them communicating with one of the three bores 158, 160 and 162. In the contact surface between the stationary casing 42 and the bushing 148 there are on both sides of the three grooves 164, 166 and 168 further four annular seals 170, 172, 174 and 176. In the stationary casing 42 are finally three bores 178, 180 and 182 which communicate with the three grooves 164, 166 and 168, respectively.

Figure 6:
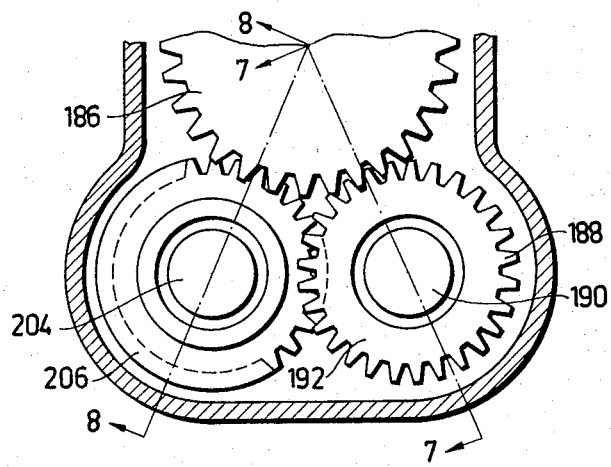
FIG. 6 shows a cross section through the back gear taken on a line 6—6 of FIG. 1.
Figure 7:
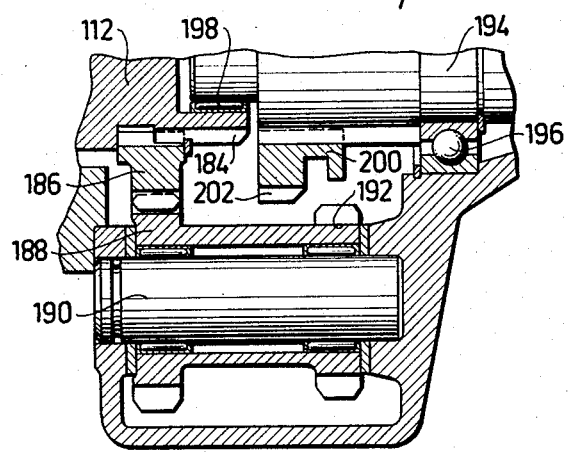
FIG. 7 shows a section taken on line 7—7 of FIG. 6.
Figure 8:
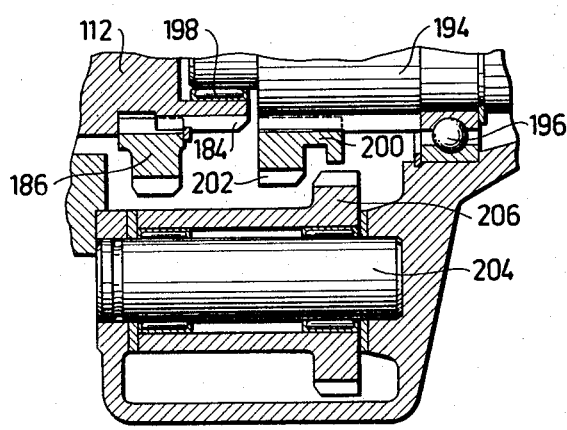
FIG. 8 shows a section taken on a line 8—8 of FIG. 6.

The propeller shaft 112 is at its end not facing the turbine shaft 64 provided with a dog clutch element 184 and a gear 186 in constant mesh with a gear 188 of a side shaft 190 (see also FIGS. 6–8). The gear 188 is further nonrotatably connected with a co-axial gear 192. Co-axially with the propeller shaft 112 an output shaft 194 is mounted in the stationary casing 42 by means of a ball bearing 196 and in the propeller shaft 112 by means of a needle bearing 198. The output shaft 194 is further provided with a nonrotatable but axially slidable clutch element 200. Said element in one position cooperates with the clutch element 184 so that the propeller shaft 112 and the output shaft 194 can be nonrotatably interconnected, and in another position it is by means of a gear rim 202 in intermesh with a gear 206 of another side shaft 204, which gear is in constant intermesh with the gear wheel 192 of the first side shaft 190, whereby the output shaft 194 will be driven in a direction opposite to that of the propeller shaft 112. The clutch element 200 will be switched between its different positions by means of a clutch fork 208.

Figure 9:
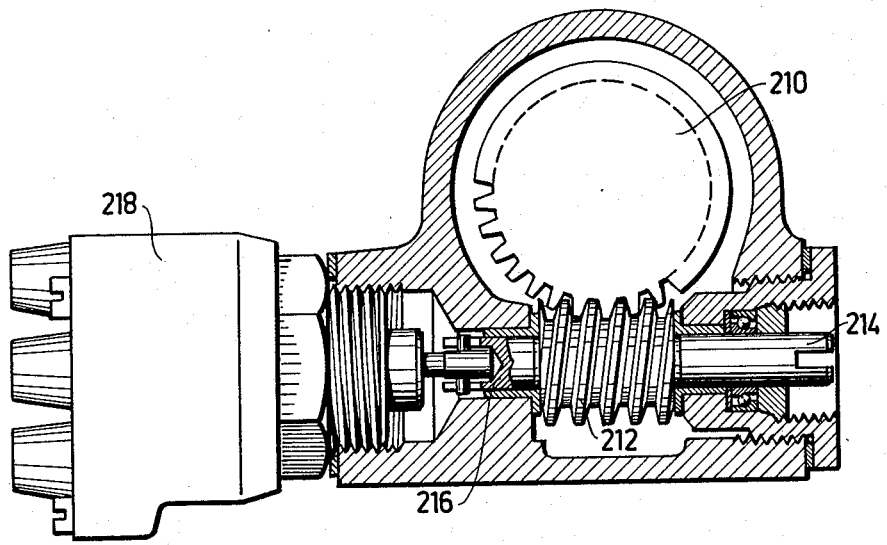
FIG. 9 shows a cross section taken on a line 9—9 of FIG. 1.
Figure 10:
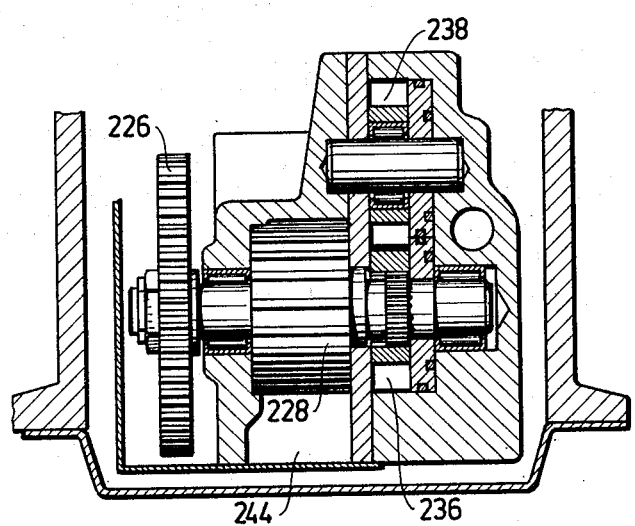
FIG. 10 shows a section taken on a line 10—10 of FIG. 2.
Figure 12:
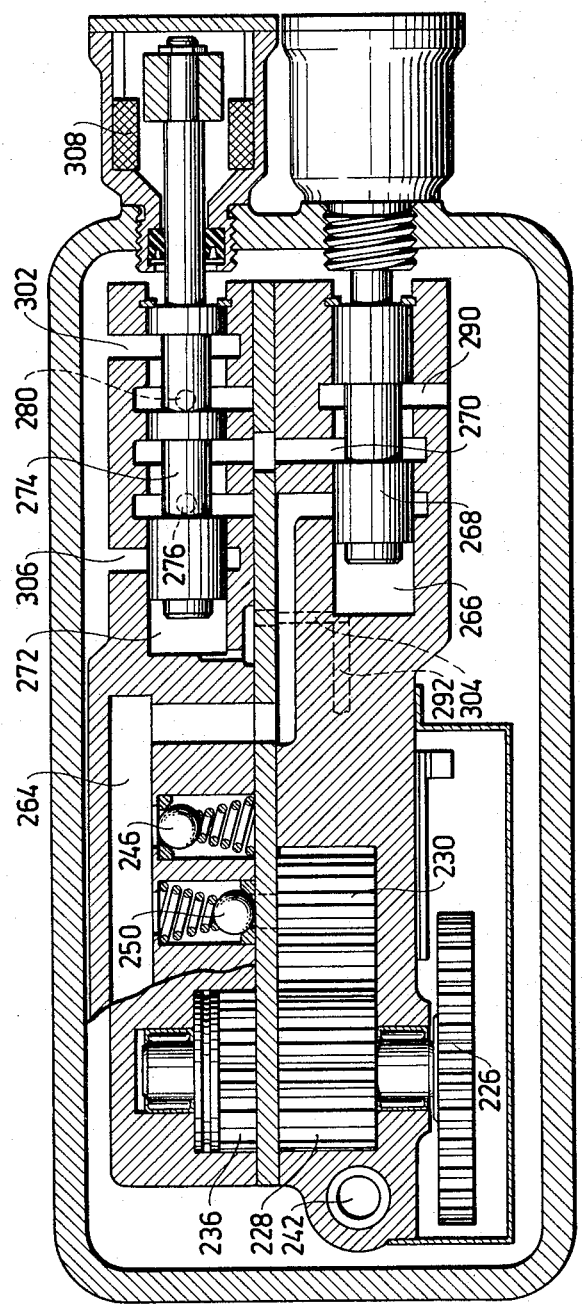
FIG. 12 shows a section taken on a line 12—12 of FIG. 2.
Figure 13:
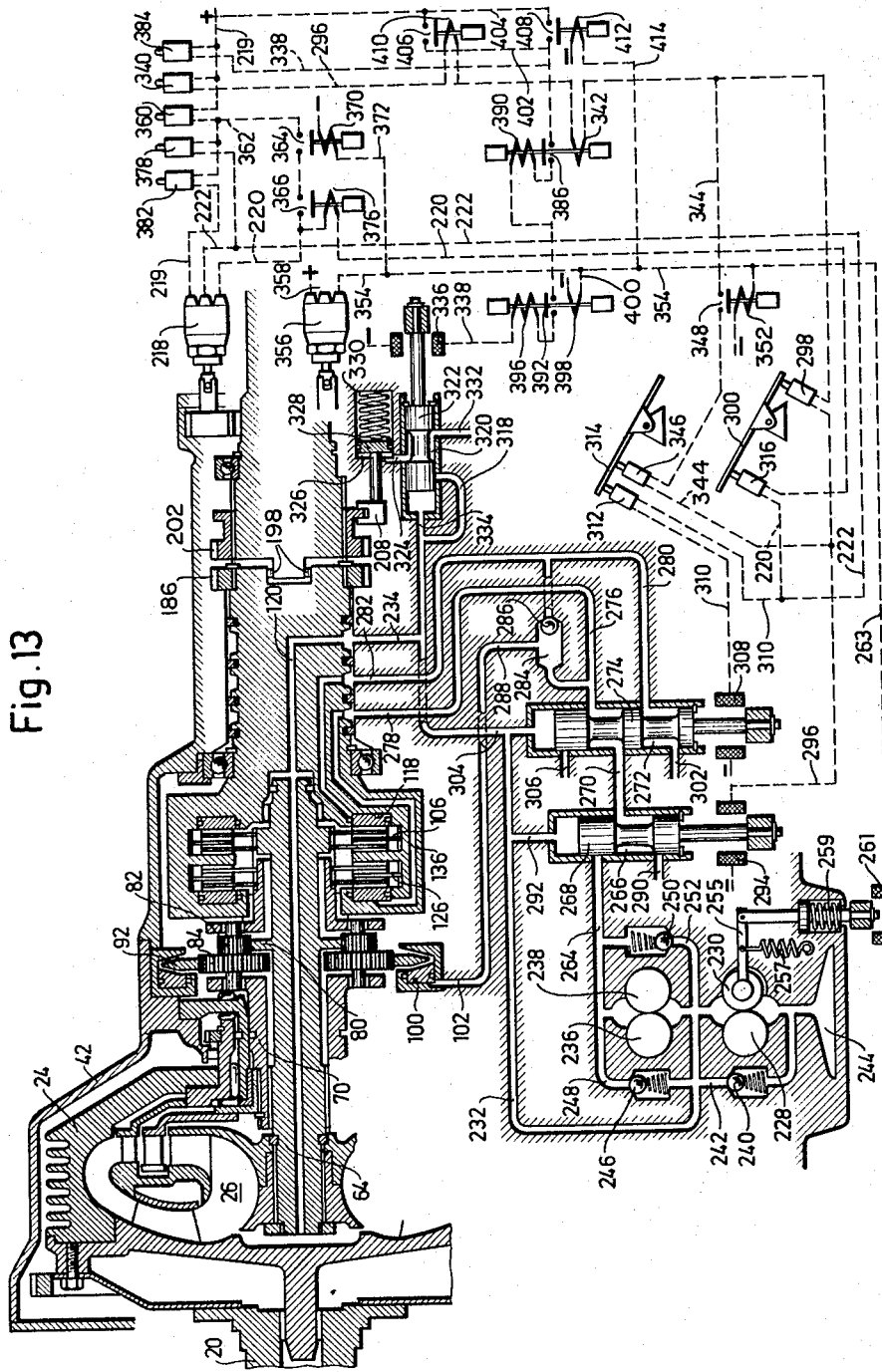
FIG. 13 shows an electro-hydraulic coupling scheme for the transmission according to FIGS. 1–12.

The output shaft 194 is furthermore provided with a gear 210 for driving a pinion 212, which drives a shaft 214 connected with the speedometer of the vehicle and another shaft 216 connected to a centrifugally regulated switch 218 of a type known per se (see also FIGS. 9 and 13). Electric current is normally supplied from a current source through a wire 219 to the switch 218 for shifting at a first certain speed of the output shaft 194 from a first position, in which no electric current is transmitted through the switch to an operation device, which is then in a position where the second disk clutch 126 is engaged to a second position, in which electric current is transmitted to the operation device through a wire 220 in order to normally engage the first disk clutch 106 and for shifting at another predetermined speed of the output shaft 194 from the second position to a third position in which electric current is transmitted to the operation device through a wire 222 in order to engage the first disk clutch 106 independently of the engine power.

The detailed design of the operation device regulating the shifting at the predetermined speeds will be seen from the continued description.

The gear 48 on the tubular shaft 34 of the rotating casing 24 is a constant intermesh with a gear 224 mounted in bearings in the stationary casing 42. This gear 224 is further in constant intermesh with a gear 226 forming the primary driving element in the operation device of the transmission (see also FIG. 2 and FIGS. 10–13). The shaft carrying the gear wheel 226 carries also the driving gear 228 of a low pressure pump, which also comprises a second corotating gear 230. The low pressure pump 228, 230 supplies through a channel 232 in the operation device and a pipe 234 working liquid under pressure to the bore 182 and therefrom via the groove 168, the bore 162, the groove 146, the bore 144, the bore 142 and the central bore 66 of the turbine shaft 64 to the working chamber 26, so that the pressure will there always be kept on a sufficiently high level. The shaft carrying the gears 226 and 228 carries also a gear 236 forming the driving gear in a high pressure pump, which furthermore comprises a second corotating gear 238. The high pressure pump, which is dimensioned to have a considerably lower capacity than the low pressure pump 228, 230, has its inlet connected directly with the outlet of the low pressure pump.

In connection with the two pumps three non-return valves are arranged. One of them, 240, is provided in a pipe 242 from the outlet of the low pressure pump 228, 230 and the liquid sump 244, from which the low pressure pump is sucking liquid, and functions as a maximum pressure valve for the low pressure pump. A second valve 246 in a pipe 248 from the outlet of the high pressure pump 236, 238 to the outlet of the low pressure pump functions as a maximum pressure valve for the high pressure pump. The third valve 250 is provided in a second pipe 252 between the outlet of the low pressure pump 228, 230 and the outlet of the high pressure pump 236, 238 and functions as an overflow valve for transmission of pressure liquid from the outlet of the low pressure pump to the outlet of the high pressure pump, when the capacity of the high pressure pump is too small for a quick filling of a cylinder of the servo-motor. In this way a quick filling will be obtained and consequently a quick shifting of the servo-motors in spite of the small capacity of the high pressure pump, which means a considerable saving of power in comparison with a case when the high pressure pump is dimensioned to fill the cylinders of the servo-motors all by itself so quickly that the time for shifting could be sufficiently short to secure a satisfactory function of the transmission.

The design of the low pressure pump 228, 230 further allows its capacity to be varied in that the corotating gear wheel 230 is carried in bearings by an eccentrically arranged race 256 on angularly adjustable shaft 254. The cylinder wall cooperating with the gear wheel 230 comprises a circular surface portion 258, the center of which coincides with the center of the gear wheel 230, when this one is in its position for maximum capacity of the pump. This circular surface 258 has a radius, which is, with the exception of necessary clearances, equal to the outer radius of the gear 230. The part 258 of the wall continues into a second circular wall portion 260, the center of which coincides with the center of the adjustable shaft 254 and the radius of which is, with exception for the necessary clearances, equal to the outer radius of the gear 230 plus the distance between the centers of the shaft 254 and the race 256. The wall portion 260 continues finally into a third circular surface 262, the center of which coincides with the center of the gear 230, when this gear is in the position for minimum capacity of the pump, and the radius of which is, with exception for the necessary clearances, equal to the outer radius of the gear 230. By adjustment of the shaft 254 the displacement volume of the low pressure pump can be reduced at increasing speed, which means that the low pressure pump can get a practically constant capacity independently of the running speed, which means a substantial saving of power at high speeds, since the low pressure pump must be dimensioned to get a sufficient capacity for a quick filling of the cylinders of the servo-motors already at low speeds. On the shaft 254 a lever 255 is nonrotatably mounted and is by a spring 257 influenced in such a direction that it tries to turn the shaft 254 to the angular position corresponding to maximum displacement volume of the low pressure pump 228, 230. The back pressure from the high pressure side of the pump tries on the other hand to give the low pressure pump a minimum displacement volume, which corresponds to a turning of the shaft 254 in the opposite direction. The lever 255 is further influenced in a direction towards maximum displacement volume by a second spring 259, the force of which is balanced, when the vehicle is moving, by a solenoid 261 getting current through a wire 263.

The outlet of the high pressure pump 236, 238 communicates via a channel 264 with a primary valve chamber 266 having a primary valve body 268 which is slidable between two different positions. The primary valve chamber 266 communicates via a channel 270 with a secondary valve chamber 272 having a secondary valve body 274, which is also slidable between two positions. The secondary valve chamber 272 communicates through a first channel 276, a pipe 278, the bore 180, the groove 166, the bore 160, the groove 138 and the channel 136 with the chamber 134 of the second disk clutch 126, and through a second channel 280, a pipe 282, the bore 178, the groove 164, the bore 158, the groove 122 and the channel 120 with the chamber 118 of the first disk clutch 106. The channels 276 and 280 communicate both with a valve chamber 284, in which a valve body 286 is slidable between two different positions, in each of which the valve body 286 seals one of the two connections between the valve chamber 284 and the two channels 276 and 180. The valve chamber 284 communicates further constantly via a channel 288 and the channel 102 with the chamber 100 for the brake 94 of the ring gear 92.

The primary valve body 268 is moved to one of its end positions, where the communication between the channels 264 and 270 is broken and in which the channel 270 communicates with an outlet 290 by means of pressure liquid which is brought to the primary valve chamber 266 from the low pressure pump 228, 230 through a channel 292 in constant communication with the channel 232. The primary valve body 268 is moved to its other end position, where the channels 264 and 270 communicate with each other while the outlet 290 is closed, by means of an electric solenoid 294 receiving current from a current source through a wire 296 having a switch 298 which breaks the current when the accelerator 300 of the vehicle is in its neutral position.

The secondary valve body 274 is moved to one of its end positions, where the channel 270 communicates with the channel 276 and the channel 280 with an outlet 302 by means of pressure liquid which is brought to the secondary valve chamber 272 from the low pressure pump 228, 230 through a channel 304 in constant communication with the channel 232. The secondary valve 274 is moved to its other end position, where the channel 270 communicates with the channel 280 and the channel 276 with an outlet 306 by means of an electric solenoid 308 getting current from the switch 218, which is controlled by the centrifugal regulator, through a wire 310, which is by means of two different branch wires 220 and 222 connected with the switch 218 controlled by the centrifugal regulator. The wire 310 has a switch 312 which is normally closed but which can be shifted over to another position, in which the current is broken by means of the braking pedal 314 of the vehicle. The wire 220 has further on a switch 316, which is normally closed, but which can be shifted over to another position in which the current is broken by means of the accelerator 300 of the vehicle, when it is pushed through its position for maximum engine power.

The channel 232 from the outlet of the low pressure pump 228, 230 communicates by means of a channel 318 with a third valve chamber 320 with a tertiary valve body 322 which is slidable between two different positions. The valve chamber 320 communicates furthermore through a channel 324 with a cylinder 326, in which a piston 328 fixed to the clutch fork 208 for the back gear is slidable against the force of a spring 330. The tertiary valve body 322 is moved to one of its end positions, where the communication between the channels 318 and 324 is broken and where the channel 324 instead communicates with an outlet 332, so that the piston 328 is moved to its left end position by the spring 330, which means shifting of the reverse gear to forward drive position by means of pressure liquid which is brought to the third valve chamber from the low pressure pump 228, 230 through a channel 334 being in constant communication with the channel 232. The tertiary valve body 322 is moved to its second end position, in which the channels 318 and 324 communicate with each other, while the outlet 332 is closed, so that the piston 328 is against the force of the spring 330 moved to its right hand end position, which means shifting of the reverse gear for reverse drive by means of a solenoid 336 getting current from a current source through a wire 338.

At the driver's seat of the vehicle there are five manually operated switches, which are connected so that they can only one at a time be switched over from their neutral positions (see FIG. 13), i.e., when engaging one switch the earlier engaged one will automatically go back to its neutral position.

The first one 340 of these switches connects between the wires 219 and 296 and switches on the current in normal position while it is breaking the current in its second position. The wire 296 has also relay windings 342, the function of which will be understood from the following. The wire 296 is furthermore provided with a branching 344 bypassing the switch 298, which branching 344 passes through a switch 346, which is normally broken by the brake pedal 314 of the vehicle, and which in its second position closes the current through the branching 344 and consequently between the switch 340 and the solenoid 294. The wire 344 is also passing through a switch 348, which is normally open but which can be switched on by relay windings 352 arranged on a wire 354 being connected by a second switch 356, which is controlled with a centrifugal regulator driven by the output shaft 194. The switch 356 is provided to connect the wire 354 with a current source connected with a wire 358 at very low speeds of the output shaft 194, corresponding to a speed of, e.g., 1 km. per hour for the vehicle.

The second one 360 of the switches at the driver's seat is connected to the wire 219 between the switch 340 and the switch 218 controlled with a centrifugal regulator. On the same side of the switch 360 as the switch 218 the wire 219 is further via a branching 362 connected to the wire 220. The branching 362 is provided with two switches 364 and 366. The first one 364 is normally open but can be switched on by relay windings 370 provided in a branching 372 of the wire 354. The other one 366 is normally open but can be switched on by relay windings 376 of the wire 220.

The third one 378 of the switches arranged at the driver's seat is connected between the wire 219 at a point between the wire 362 and the switch 218 and a branching 380 of the wire 222. This switch 378 is in its normal position arranged to break the connection between the wires 219 and 380 and in its second position to connect said wires, so that the current is switched on between the switch 378 and the solenoid 308 via the switches 218 and 316.

The fourth one 382 of the switches arranged at the driver's seat is provided on the wire 219 between the switch 378 and the switch 218. This switch 382 is in its normal position arranged to break the current through the wire 219 and in its second position to switch on this current, so that current will be brought to the switch 218 for an automatic connection and disconnection of the solenoid 308 in cooperation with the switches 316 and 312 and consequently for an automatic shifting between the first and the second disk clutch 106 and 126, respectively.

The fifth one 384 of the switches at the driver's seat is provided to connect a point of the wire 219 farther from the switch 218 than the switch 382. This switch 384 is in its normal position to break the connection between the wires 219 and 338 but should in its second position connect those two wires. The wire 338 has further a normally engaged switch 386, which is acted upon in breaking direction by the relay windings 342 of the wire 296 and which is held in its normal, engaged position by relay windings 390 of the wire 338. The relay windings 342 are so dimensioned that the switch 386 is kept in a broken position as long as the wire 296, 344 brings current to the solenoid 294. When this current is broken, the switch 386 is switched on, whereby current can be brought from the switch 384 to the solenoid 336 for the reverse gear. The relay windings 390 are so dimensioned in comparison with the relay windings 342 that when the current passes through the wire 338 the switch 386 is kept in switched on position irrespective if the relay windings 342 are charged or not as long as the wire 338 is charged. The wire 338 is further provided with a switch 392 which is normally engaged and the relay windings 396 are constantly keeping the switch 392 engaged when the wire 338 is charged. The switch 392 is also influenced by the relay windings 398 of a branching 400 of the wire 354. The relay windings 398 influence the switch 392 in such a way that the switch 392 is kept in a broken position when the wire 338 is currentless and the wire 354 is charged.

The wires 219 and 338 are further interconnected by two wires 402 and 404 provided with normally broken switches 406 and 408, respectively, and bypassing the switch 384. The switch 406 is engaged by relay windings 410 of the wire 296, when this wire 296 is charged. The switch 408 is charged in a similar way by relay windings 412 of a branching 414 of the wire 354, when the switch 356 interconnects the wires 358 and 354.

The transmission according to FIGS. 1–13 is working in the following way. When the vehicle is started, the engine is first to be started while the switch 340 is turned on to its second position so that the connection 219, 296 is broken, which means that the blade rings and the gear wheel pumps 228, 230 and 236, 238 of the torque converter are put into rotation. The pressure from the low presure pump 228, 230 is hereby transmitted to the working chamber 26 of the torque converter, bringing about a normal working pressure therein. Simultaneously the valves 266, 268; 272, 274 and 320, 322 are put in the positions, where all the cylinders 100, 118, 134 and 326 for the brake 94, the clutches 106 and 126 and the reverse gear, respectively are emptied.

The switch 382 is then put into its second position so that the switch 340 goes back to its normal position. Hereby the current is switched on through the wire 219 to the switch 218 controlled with a centrifugal regulator and between the wires 219 and 296. By influence of the accelerator 300 of the vehicle from its neutral position the current is also switched on in the wire 296 by the switch 298, so that current is brought to the solenoid 294 from the wire 219. The solenoid 294 readjusts the primary valve body 268 against the influence of the pressure liquid supplied through the channel 292 so that the channel 264 will communicate with the channel 270 and the outlet 290 will be closed. The high pressure liquid in the channel 264 will then through the channels 270, 276, 278 and 136 flow to and fill the cylinder 134. At the same time the pressure liquid will also flow from the channel 270 through the valve chamber 284 and the channels 288 and 102 to the cylinder 100. The valve 286 then closes the connections between the channels 280 and 288. Due to the loss of liquid in the valve chamber 284 the brake 94 is hereby engaged after the engagement of the clutch 126. On account of the very small capacity of the high pressure pump 236, 238 the pressure in the channel 264 hereby falls, the valve 250 will be opened and pressure liquid from the low pressure pump 228, 230 will flow through the channel 252 to the channel 264 and quickly fill the cylinders 100 and 134. When these cylinders have been filled the pressure in the channel 264 rises again to the normal outlet pressure of the high pressure pump 236, 238 so that the valve 250 will be automatically closed and the pressure in the cylinders 100 and 134 rise to the intended working pressure in order to secure that no sliding will occur in the brake 94 or the clutch 126. The outlet pressure from the high pressure pump 236, 238 will then be kept on a constant level by overflow through the maximum pressure valve 246 to the high pressure side of the low pressure pump. By engagement of the clutch 126 the planet carrier 86 and consequently the reaction shaft 70 will be connected with the propeller shaft 112 and by engagement of the brake 94 the speed ratio is fixed between the turbine and reaction shafts 64 and 70, respectively, from the torque converter to the one determined by the planetary gear 80, 82, 84, 92. The reaction shaft 70 is hereby slowed down to practically standing-still and also the speed of the turbine shaft 64 is reduced by the planetary gear 80, 82, 84, 92 to a very low value. Hereby the speed ratio between the turbine and pump parts in the torque converter will be close to zero, which causes a big torque absorption ability of the pump at a moderate engine speed, and a large torque conversion from the pump to the turbine, which is normally the case for hydrodynamic torque converters. Furthermore an extra torque conversion will be obtained in the planet gear 80, 82, 84, 92 from the turbine shaft 64 to the planet carrier 86, which is connected to the propeller shaft 112 through the clutch 126. A big torque conversion will thus be obtained on the propeller shaft 112 and consequently on the driving wheels of the vehicle, which gives the vericle a quick acceleration.

When the vehicle starts moving the switch 356 controlled with a centrifugal regulator interconnects the wires 358 and 354, and the switches 348 and 364 are adjusted to an engaged position by the relay windings 352 and 370, respectively, and the switch 392 is adjusted to a broken position by the relay windings 398.

When the speed of the vehicle is increasing, also the speed of the propeller shaft 112, the planet carrier 86, the reaction shaft 70 and the turbine shaft 64 is increasing. The speed ratio between the turbine and the pump parts in the torque converter then increases, which causes a reduced torque conversion within the torque converter as well as a decrease of the engine torque absorbed by the pump. If the position of the accelerator 300 of the vehicle is not changed, the engine speed will therefore increase which causes an increase of the torque absorption ability of the pump as well as a decrease of the speed ratio between the turbine and the pump, i.e. an increase of the torque conversion within the torque converter, so that a continued good acceleration will be obtained for the vehicle.

When the speed of the vehicle has increased to the speed corresponding to the first predetermined speed of the output shaft 194, for which the switch 218 is set, the switch 218 interconnects the wires 219 and 220. Provided the accelerator 300 is not in a position to influence the switch 316, current will hereby be brought to the solenoid 308 and at the same time the switch 366 of the wire 362 will be engaged. The solenoid 308 will then against the force of the pressure liquid supplied through the channel 304 move the secondary valve body 274 to the position where the channel 270 communicates with the channel 280 and the channel 276 with the outlet 306, while the outlet 302 is closed. Hereby the cylinders 100 and 134 of the brake 94 and the clutch 126, respectively, will be emptied through the outlet 306. At the same time the cylinder 118 of the clutch 106 will, however, be filled through the channels 120, 282, 280 and 264 and the pumps 236, 238 and 228, 230, which are free through the valve 250 through the pipe 252 in the same way as stated for the cylinder 134 of the clutch 126, whereafter the pressure will be maintained by means of the high pressure pump 236, 238. The pressure in the channel 280 will also set the valve body 286 in the valve chamber 284 so that the channel 284 will be sealed against the pipe 276 and instead be connected with the channel 280. Hereby the pressure liquid will flow from the channel 280 through the valve chamber 284, the channels 288 and 102 to the cylinder 100. As a consequence of the delay in the valve chamber 284 the brake 94 will again be engaged but not before the clutch 106 has been engaged. In this way the transmission will be shifted by disengaging of the clutch 126 and engaging of the clutch 106.

During the shifting the propeller shaft 112 will due to the mass and inertia of the vehicle maintain a constant speed which causes an automatic decrease of the speed of the turbine shaft 64 to the speed that the reaction shaft 70 had before the shift. The speed ratio between the turbine and the pump should then at constant engine speed increase proportionally to the speed ratio in the planet gear 80, 82, 84, 92. Hereby both the torque conversion in the torque converter and the torque absorption ability of the pump part should increase. Due to the increased torque absorption of the pump the practical result will, however, be that the engine speed will at the shift decrease automatically at the same time as the turbine speed so that the power consumption from the engine will be unchanged. The engine speed will, however, not decrease as much as the turbine speed, so that the speed ratio between the turbine and the pump decreases, which means that the torque conversion within the torque converter will increase, which is of the greatest importance for the possibility of a further acceleration of the vehicle with the transmission in its new running condition.

Provided the accelerator 300 is in the position where the switch 316 breaks the current through the wire 220, the solenoid 308 will not be influenced when the output shaft 194 reaches the first predetermined speed for the switch 218 and the above mentioned shift from the clutch 126 to the clutch 106 will not be forthcoming. When the output shaft reaches its second predetermined speed, the switch 218 is adjusted so that the wire 219 is connected with the wire 222, whereby the switch 316 is bypassed. In this way the solenoid 308 is operated independently of the position of the accelerator 300 so that the clutch 126 is disengaged and the clutch 106 engaged. The same situation arises if the accelerator 300 is adjusted so that the current through the switch 316 is switched on at a speed of the output shaft 194 lying between the two predetermined speeds for the switch 218.

If the vehicle is driven with a speed surmounting the limit speed corresponding to the second predetermined speed of the output shaft 194 and the clutch 106 is thus engaged and the speed of the vehicle is decreased below said limit speed the switch 218 is adjusted so that the wire 219 is connected with the wire 220 instead of the wire 222.

If the speed of the vehicle is then reduced further below the speed at which the switch 218 at acceleration interconnects the wires 219 and 220 there will, however, be no change, since the switch 366 of the wire 362 is kept in switched on position by the current in the wire 220 and is thus bypassing the switch 218 independently of the speed of the output shaft 194 so that the clutch 106 is kept engaged also at low speeds of the vehicle, which means a good fuel economy.

At quick acceleration when the accelerator 300 of the vehicle influences the switch 316, the current through the wire 220 is, however, broken so that the clutch 106 is disengaged and the clutch 126 engaged, which gives the same situation as that of the above stated starting conditions in that the relay windings 376 of the wire 220 become currentless and the switch 366 is thus adjusted to a broken position.

If the accelerator 300 is adjusted to its zero position during the running of the vehicle, the current in the wire 296 is broken by means of the switch 298, so that the solenoid 294 becomes currentless, so that the primary valve body 268 is moved by the pressure liquid brought to the valve chamber 266 through the channel 292. Both the brake 94 and the clutches 106 and 126 are then disengaged and the vehicle rolls without being braked by the transmission on the engine.

If the brake pedal 314 is operated at the same time the current through the wire 310 is broken by the switch 312 and the current through the wire 344 is switched on by the switch 346, so that the switch 298 of the wire 296 is bypassed, which means that the solenoid 308 becomes currentless while the solenoid 294 receives current. The result will then be that the brake 94 and the clutch 126 are kept engaged while the clutch 106 is disengaged. Due to the big speed ratio in the torque converter between the turbine and the pump a large hydraulic braking force arises in this way, which will be still stronger as the pump is trying to increase the engine speed, which causes a braking effect also from the engine.

If the vehicle is put to standing-still, i.e. at traffic lights or in a queue of vehicles, the switch 356 controlled by a centrifugal regulator breaks the connection between the wires 358 and 354. The switch 364 of the wire 362 is then broken, which means that the solenoid 308 becomes currentless, so that the secondary valve body 274 is adjusted by the pressure liquid through the channel 304 to the position where the channel 270 communicates with the channel 276 to engage the clutch 126. Furthermore the switch 348 of the wire 344 is opened, so that a possible engagement of the switch 346 with the brake pedal 314 will have no effect. Furtheron, the current through the wire 263 is broken, which means that the solenoid 261 becomes currentless so that the low pressure pump 228, 230 is changed over to maximum displacement volume by the second spring 259. If the accelerator 300 of the vehicle is at the same time set to its zero position, the switch 298 breaks the current through the wire 296 so that the solenoid 294 becomes currentless, since the wire 344 is broken at the same time. The primary valve body 268 is then adjusted by the pressure liquid supplied through the channel 292 to the position, where the channel 270 communicates with the outlet 290. Hereby the transmission is thus fully disengaged bringing the losses down to a minimum but prepared to immediately engage the clutch 126 and the brake 94, i.e., low gear, when the accelerator is adjusted.

When the vehicle is shifted into reverse drive it must be slowed down so that the switch 356 breaks the connection between the wires 358 and 354 so that the relay windings 398 become currentless, which means that the switch 392 of the wire 338 is switched on and so that the solenoid 296 becomes currentless, which means that the clutch 106 and 126 and the brake 94 are disengaged and the switch 386 of the wire 338 is switched on.

If the switch 384 is at the same time adjusted to its second position, the wire 338 is connected with the wire 219 and the solenoid 336 receives current from the wire 219. The solenoid 336 is thereby switching the third valve body 322 against the force of the pressure liquid supplied through the channel 334, so that the channel 318 communicates with the channel 324, while the outlet 332 is closed. Pressure liquid then flows into the cylinder, whereby the piston 328 is moved towards the right against the force of the spring 330, which means that the piston 328 by means of the clutch fork 208 moves the clutch element 200 out of engagement with the clutch element 184 to the position, where the gear wheel 202 is put into engagement with the gear 206. When the accelerator 300 is adjusted from its zero position, the current through the wire 296 to the solenoid 294 is switched on and the brake 94 and the clutch 126 are engaged so that the vehicle is adjusted for reverse drive. Here the tertiary valve body is moved and the vehicle is put into reverse drive. Since the switches 386 and 392 are kept in their closed positions by relay windings 390 and 396, respectively, as long as the wire 338 is charged, the two switches are not influenced by the fact that the relay windings 342 and 398 become charged again but the transmission is set for reverse drive as long as the switch 384 is in its second position.

When the switch 384 is again put to its normal position, the wire 338 is still connected with the wire as long as at least one of the switches 406 and 406 are kept in a closed position by current through the relay windings 410 and 412, respectively. Before the reverse gear can be changed over from reverse to forward drive the vehicle must therefore be slowed down to practically standing-still and the solenoid 294 be made currentless, which means that the clutches 106 and 126 and the brake 94 are disengaged and the current to the solenoid 336 is broken so that the tertiary valve body 322 is by the pressure liquid coming through the channel 334 moved to the position, where the channel 324 communicates with the outlet 332 and not with the channel 318. The pressure in the cylinder 326 then falls and the piston 328 is moved to the left by the spring 330 so that the clutch fork 208 moves the clutch element 200 so that the gear wheel 202 is disengaged from the gear 206 and the clutch element 200 is put into engagement with the clutch element 184. As soon as the accelerator 300 is adjusted from its zero position and the switch 298 closes the wire 296, the transmission is therefore shifted into forward drive.

If the switch 360 and not the switch 382 is adjusted to its second position, the switch 218 is bypassed and the solenoid 308 is constantly currentless. In this way the secondary valve body 274 is constantly kept in the position, where the channels 270 and 276 communicate with each other and the channel 280 communicates with the outlet 302. As soon as the solenoid 294 is supplied with current, the clutch 126 and the brake 94 are thus engaged and remain engaged independently of the speed of the vehicle.

If instead the switch 378 is adjusted to its second position, the switch 218 is bypassed and is also connecting the wire 219 with the wire 222 so that the solenoid 308 is constantly supplied with current except when the switch 312 influenced by the brake pedal 314 breaks the wire 310. In this way the secondary valve body 274 is except on braking occasions constantly kept in the position where the channels 270 and 280 communicate with each other and the channel 276 communicates with the outlet 306. As soon as the solenoid 294 is supplied with current the clutch 106 and the brake 94 are therefore engaged and remain engaged independently of the speed of the vehicle.

Figure 14:
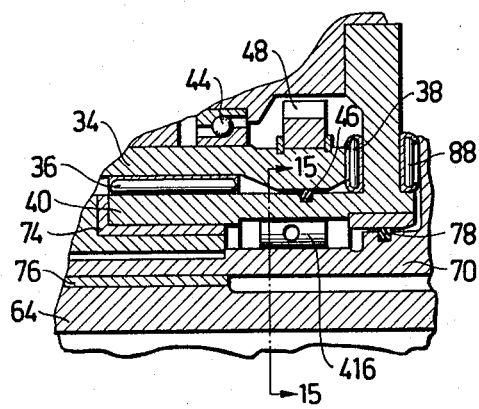
FIG. 14 shows a modification of a detail of FIG. 1.
Figure 15:
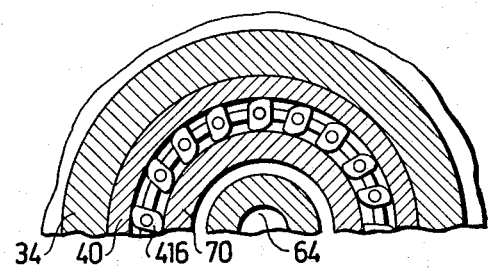
FIG. 15 shows a section taken on a line 15—15 of FIG. 14.

The modification according to FIGS. 14 and 15 differs from the transmission shown in FIGS. 1–13 in that the reaction shaft 70 and the tubular part 40 have been designed as races for a freewheel mechanism of a known type, which comprises a number of locking blocks 416. This freewheel mechanism is designed so that the reaction shaft 70 cannot rotate in a direction opposite to that of the pump and turbine. The freewheel mechanism 40, 70, 416 is automatically engaged when the brake 94 is disengaged, which means one further gear ratio in combination with each of the clutches 126 and 106. When the clutch 126 is engaged and the brake 94 disengaged a higher starting gear will in this way be obtained, which can be used at low speeds of the vehicle. When the clutch 106 is engaged and the brake 94 disengaged, an extra acceleration gearing is obtained, which can be used at higher speeds of the vehicle than the gear ratio which is obtained with the clutch 126 and the brake 94 engaged.

Figure 16:
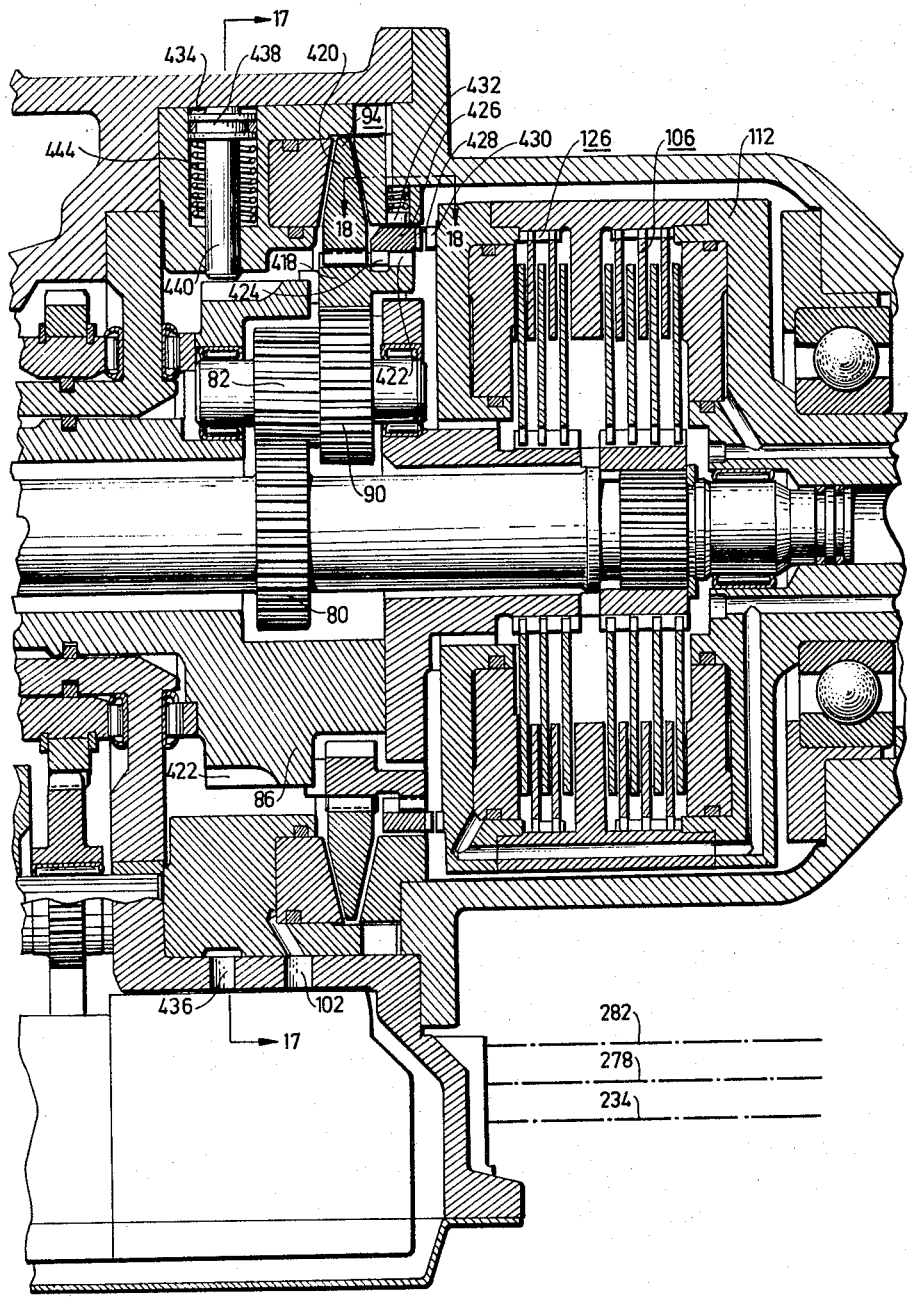
FIG. 16 shows a fraction of a longitudinal section corresponding to FIG. 1b through a second embodiment of the invention.
Figure 17:
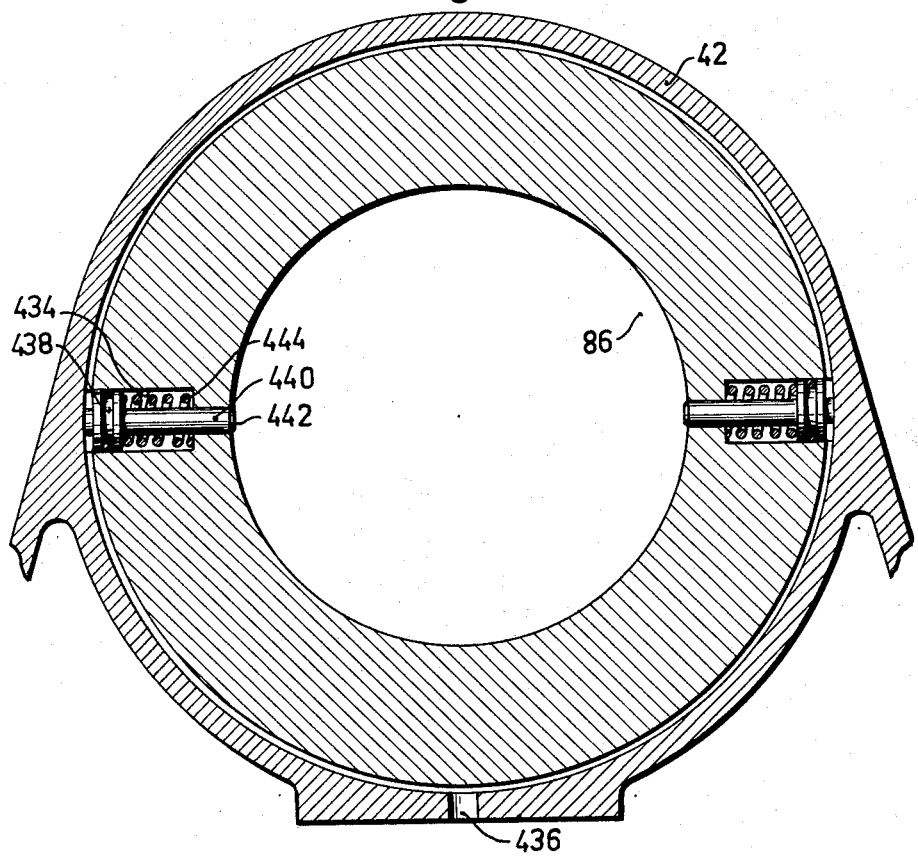
FIG. 17 shows a cross section taken on a line 17—17 of FIG. 16.
Figure 18:
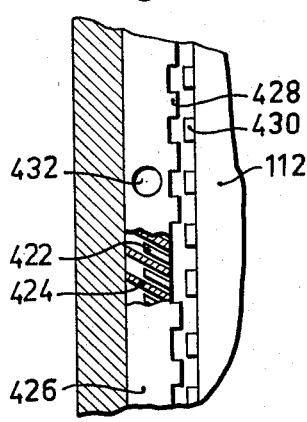
FIG. 18 shows a section taken on a line 18—18 of FIG. 16.

The embodiment shown in FIGS. 16–18 differs from the embodiment shown in FIGS. 1–13 as to the reverse gear. In the embodiment shown in FIG. 16 the reverse gear comprising the details 184, 186, 188, 190, 192, 200, 202, 204, 206 and 208 shown in FIGS. 1 and 6–8 is thus missing and furtheron the output shaft 194 is made in one piece with the propeller shaft 112, which of course means that there is no bearing 198 and 196. The planet gear has been altered so that the sun gear 80 has been displaced in an axial direction towards the hydrodynamic torque converter and the rims 82 and 90 have interchanged their axial positions. The ring gear 92 with its conical friction plate has been exchanged for a ring wheel 418 provided with an outer straight toothing and carried in bearings by the planet carrier 86 and for a separate conical friction plate 420, which is axially movable but nonrotatable in relation to the ring gear 418 by an inner straight toothing. The ring gear 418 is also provided with helical teeth 422 on its outer surface cooperating with corresponding teeth 424 on the inner surface of an annular clutch element 426. The clutch element 426 is on its surface facing the propeller shaft 112 provided with a ring of axially directed clutch cogs 428 arranged to cooperate with a similar ring of clutch cogs 430 on the propeller shaft 112. In the stationary casing 42 is a number of peripherally located spring loaded friction mechanisms 432, which are counteracting the rotation of the clutch element 426. In the stationary casing 42 is further a number of peripherally located cylinders 434 which cylinders are provided with a channel 436 for the supply of pressure liquid from the regulation device of the transmission. In each of the cylinders 434 is a piston 438. Each piston 438 is stationarily connected to blocking means 440 cooperating with grooves 442 in the outer periphery of the planet carrier 86 to prevent the latter one from rotating. Each cylinder 434 has also a spring 444 which tries to move the piston 438 to a position where the blocking means 440 cannot engage the grooves 442.

The function of the transmission according to FIGS. 16–18 is for forward drive identical with that of the transmission according to FIGS. 1–12 while the following is valid for reverse drive. When pressure liquid is brought to the cylinders 434 by the channel 436 while the cylinder 100 for the brake 94 is emptied through the channel 102 the pistons 438 are pressed radially inwards against the force of the springs 444. The blocking means 440 are then moved to engagement with the grooves 442 whereby the planet carrier 86 is kept rotatably stationary in relation to the casing 42. Since the turbine shaft 66 always rotates in the same direction as the driving shaft 20, also the sun wheel 80 rotates in the same direction. As the planet carrier as said above is kept stationary, the ring gear 418 is forced into rotation in the opposite direction. When the ring wheel 418 starts rotating, the clutch element 426 will follow, but due to the braking force from the friction mechanism 432 the clutch element 426 will be delayed in the rotation and be moved in an axial direction towards the propeller shaft 112 by the helical teeth 422, 424 so that the clutch cogs 428 and 430 are put into engagement with each other. In this way there is a continuous connection between the ring wheel 418 and the propeller shaft 112, which in this way is put into rotation in the same direction as the ring gear 418, which means that the transmission is shifted over to reverse drive. When the transmission is then shifted to forward drive in that the blocking means 440 are moved radially outwards and the brake 94 and one of the clutches 106 and 126 are engaged, which means that the ring gear 418 is locked against a rotation and the planet carrier 86 and the propeller shaft 112 are rotating in the same direction as the driving shaft 20, the clutch clogs 428 are automatically put out of engagement with the clutch cogs 430.

Figure 19:
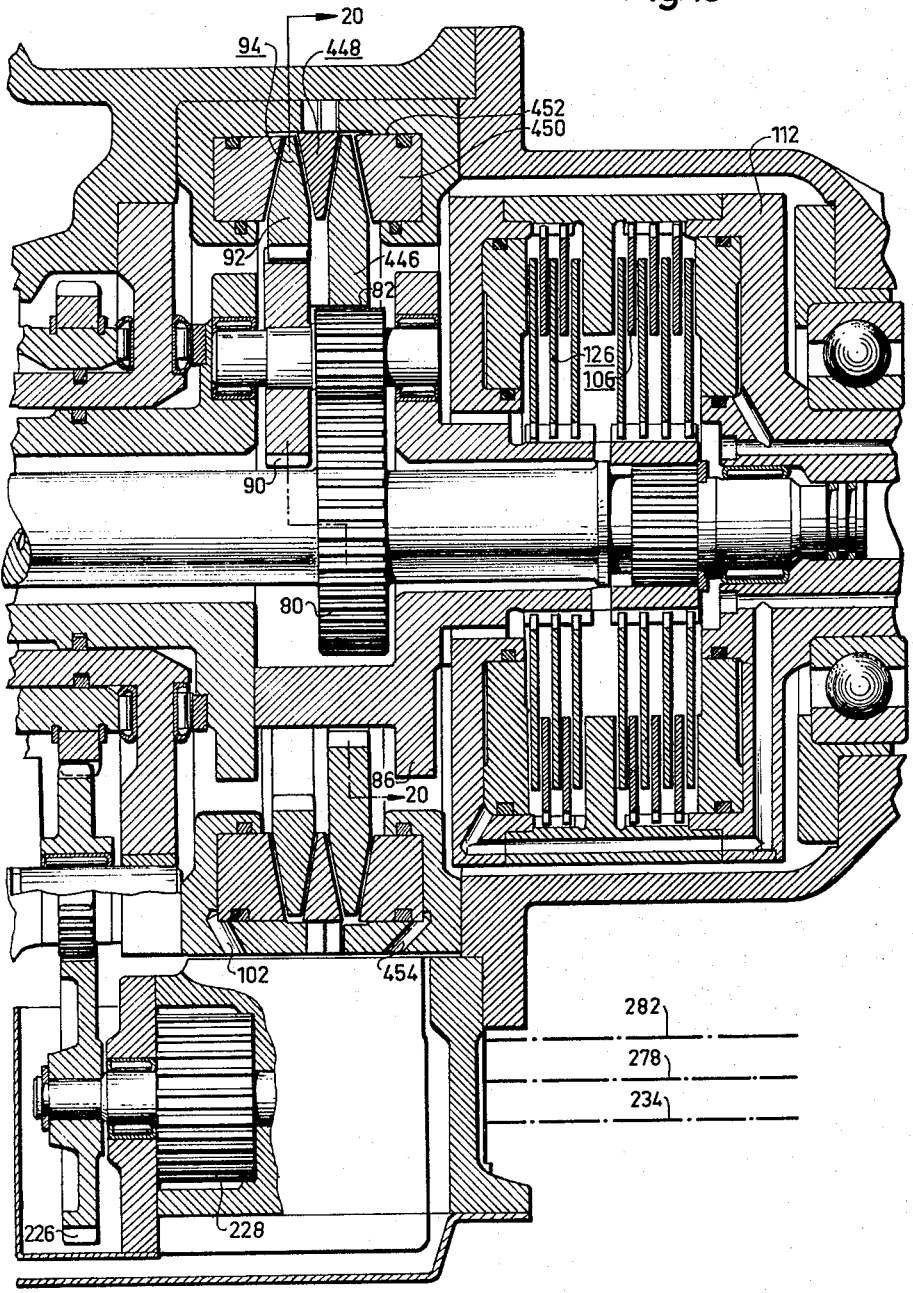
FIG. 19 shows a fraction of a longitudinal section corresponding to FIG. 1b through a third embodiment of the invention.
Figure 20:
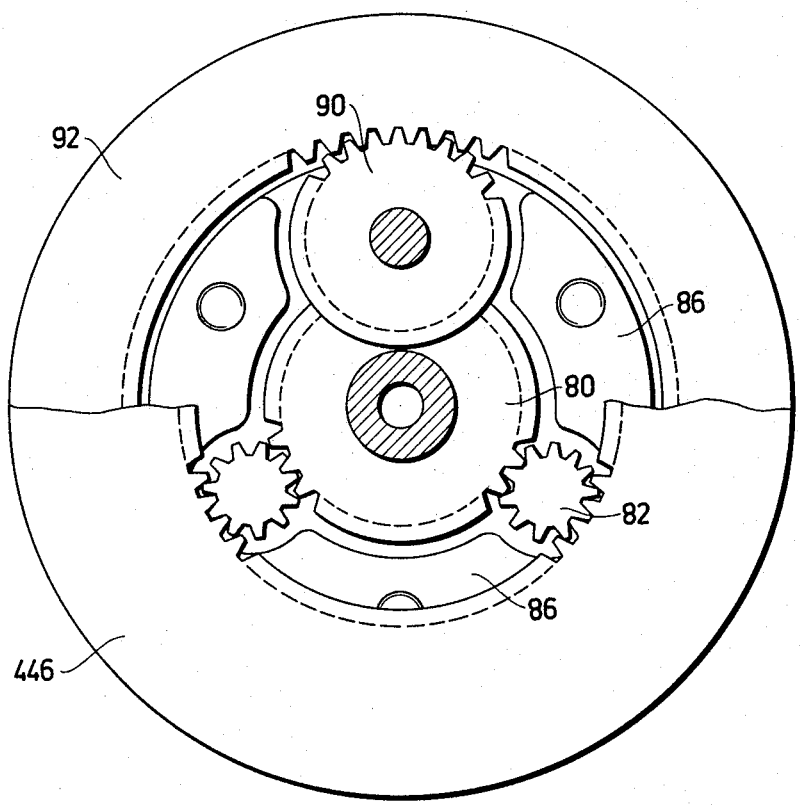
FIG. 20 shows a cross section taken on a line 20—20 of FIG. 19.

The embodiment of the transmission shown in FIGS. 19-20 differs from that shown in FIGS. 1-13 by a second ring gear 446 being in constant engagement with the rim 82 of the planets 84 and a brake mechanism acting upon by this ring gear 446. The second ring gear is in the same way as the ring gear 92 carried in bearings by the co-operating planets and provided with conical friction surfaces for automatic centering at braking. The only difference between the two ring gears is thus the diameter of the gear rim. The braking mechanism 448 is further a mirror copy of the braking mechanism 94 with a conical friction surface on the portion 98 and with a conical friction surface of a piston 450 in a cylinder 452, which communicates with the regulator of the transmission through a channel 454.

The transmission according to FIGS. 19-20 functions in the same way as the transmission according to FIGS. 1-13 with the addition of two further gear ratios as the brake 448 can be engaged instead of the brake 94 at the same time as anyone of the clutches 106 and 126. In this way four gear ratios are obtained instead of two, which gives a still better adaption of the transmission to the prevailing running conditions, which means better performance and a reduced fuel consumption.

Figure 21:
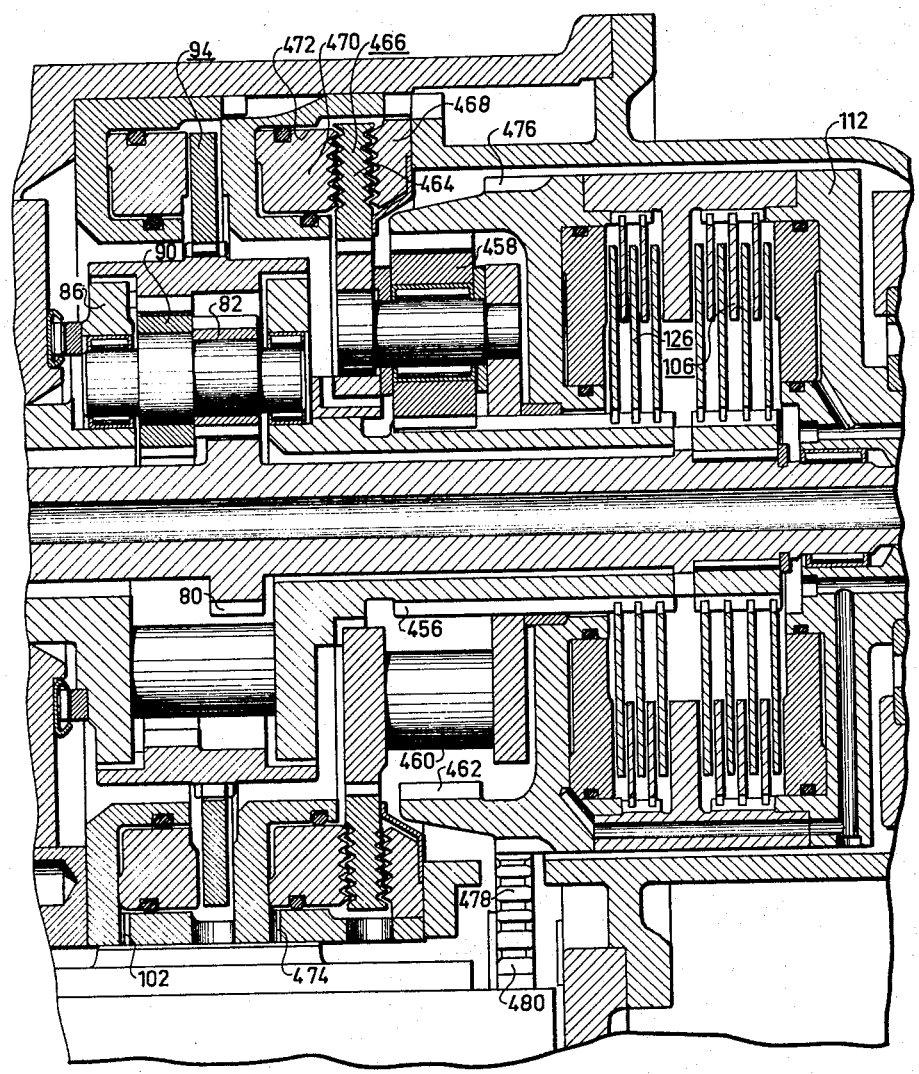
FIG. 21 shows a fraction of a longitudinal section corresponding to FIG. 1b through a fourth embodiment of the invention.

The transmission according to FIG. 21 differs from the transmission shown in FIGS. 1-13 in that there is a second planet gear between the reaction shaft and the propeller shaft, in that there is no reverse gear as shown in FIGS. 1 and 6-8 comprising the details 184, 186, 188, 190, 192, 200, 202, 204, 206 and 208, and in that the output shaft 194 is made in one piece with the propeller shaft 112, which of course also means that there is no bearing 198. The second planet gear comprises a sun gear 456 located on the planet carrier 86 and thus nonrotatably connected with the reaction shaft 70 of planets 458 rotatably mounted in a second planet carrier 460 and being in constant intermesh with the sun gear 456 and a ring gear 462 nonrotatably connected with the propeller shaft 112. The planet carrier 460 is provided with a brake disk 464 to be held by a braking mechanism 466 comprising a stationary portion 468 in the casing 42 and a piston 470 arranged in a cylinder 472, which communicates with the regulator of the transmission through a channel 474. On the propeller shaft 112 is further a gear ring 476, which is in constant intermesh with a gear 478 mounted in bearings in the casing 42. The gear 478 is further in constant intermesh with a gear 480 arranged as a second gear of the regulator. The regulator comprises further a quotient regulator, not shown, of a type known per se.

The transmission according to FIG. 21 functions in the following way. For neutral position the brakes 94 and 466 and the clutches 106 and 126 should be disengaged whereby the transmission of torque is fully broken. At start and within the low speed range the brake 466 and the clutch 106 are engaged whereby the reaction part is put into rotation in a direction opposite to the turbine and functions as a corotating torque absorbing turbine part. At a certain speed ratio between the turbine and the pump the brake 466 is disengaged and the brake 94 engaged by the ratio regulator. Hereby a shift, which is absolutely free from shocks, is obtained without change of the engine speed or the tractive force and independently of the speed of the propeller shaft. After this shift the transmission works in exactly the same way as the transmission according to FIGS. 1-13 with the brake 94 and the clutch 106 engaged. When passing said certain speed ratio in opposite direction the brake 94 is disengaged and the brake 466 engaged automatically by the ratio regulator without change of engine speed and tractive force. For a better acceleration within the mean speed range the brake 94 and the clutch 126 are engaged and the transmission works in the same way as the transmission according to FIGS. 1-13 with the corresponding brake and clutch devices engaged.

To get a hydraulic braking the brake 466 and the clutch 106 are engaged independently of the quotient regulator, which means a still more effective braking than with the brake 94 and the clutch 126 engaged, as the case is with the transmission according to FIGS. 1-13. At higher speeds when the braking effect of the brake 94 and the clutch 126 would be too strong, the vehicle could instead be braked hydraulically with the brake 94 and the clutch 126.

For reverse drive the two brakes 94 and 466 should be engaged and the two clutches 106 and 126 disengaged. Hereby the turbine and reaction shafts 64 and 70, respectively, are during conversion of the torque rotating in the same direction as the input shaft 20 while the second planet carrier 460 is kept rotatably stationary so that the ring gear 462 and the propeller shaft 112 are automatically rotating in the opposite direction. The transmission is hereby shifted to reverse drive.

Figure 22:
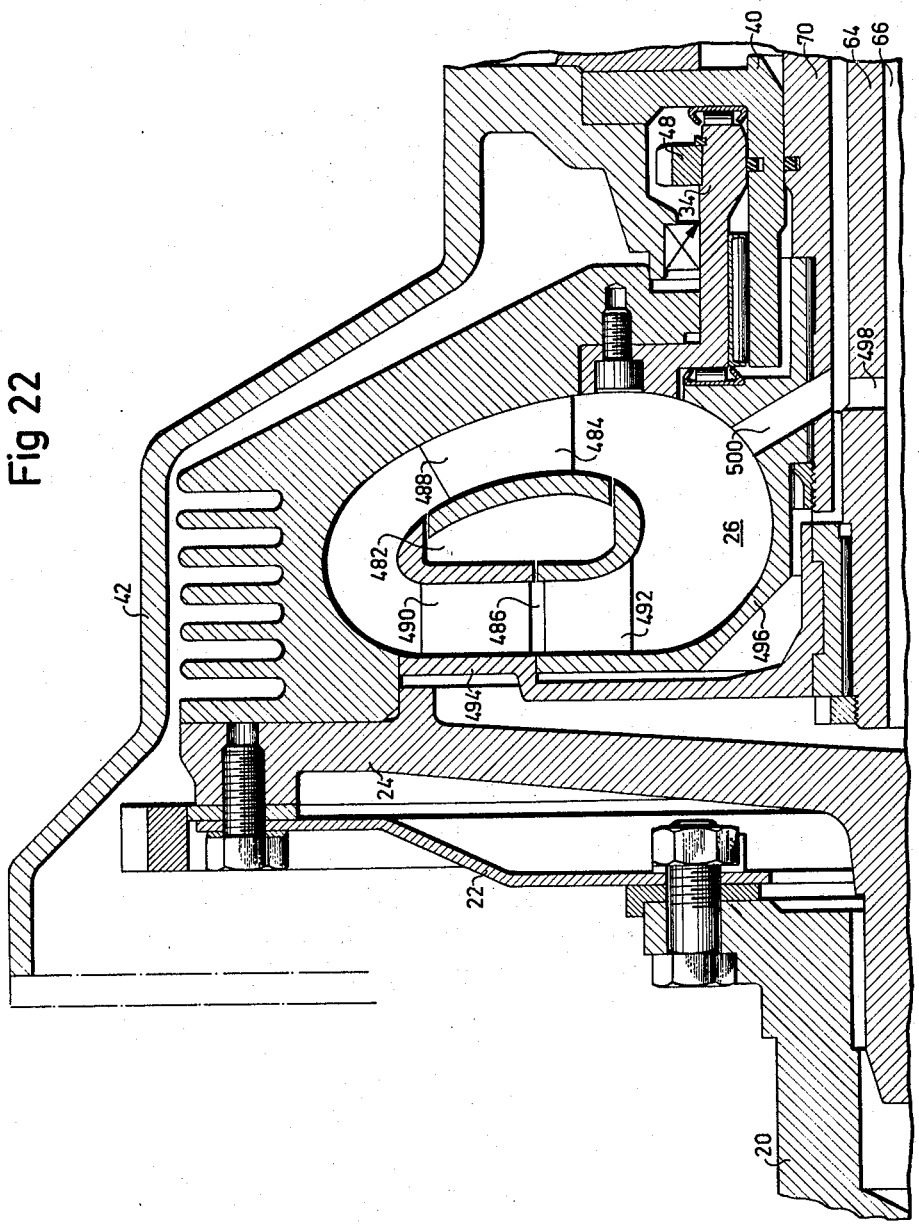
FIG. 22 shows a longitudinal section through a modified embodiment of the hydraulic system.

FIG. 22 shows still another design of the blade system in the working chamber 26 of the torque converter which can be used as an alternative in the transmissions according to FIGS. 1-20. The working chamber 26 is torus-shaped and provided with a core 482, which divides the working chamber into two channels 484 and 486, through which the working liquid flows radially in opposite directions and which channels are radially connected with each other within and outside the core 482. In the working chamber channel 484, which is located farthest away from the clutch disc 22 transmitting the torque from the driving shaft 20, is a ring of pump blades 488, which is nonrotatably connected with the rotating casing 24. In the channel 486, which is located closest to the clutch disk 22, a ring of turbine blades 490 and a ring of reaction blades 492 are provided with the latter radially inside the first one. The turbine blades 490 are nonrotatably connected with a turbine disk 494, which is nonrotatably connected with the turbine shaft 64. The reaction blades 492 are nonrotatably connected with a reaction disk 496, which is nonrotatably connected with the reaction shaft 70. The reaction disk 496 is further designed to form a wall for the working chamber 26 in its radially innermost portion. The turbine shaft 64 is provided with at least one radial bore 498 connecting the central channel 66 with the outer periphery of the turbine shaft. The reaction disk 496 and the reaction shaft 70 are further provided with at least one bore 500 passing through both of them and giving communication between the bore 498 in the turbine shaft 64 and the working chamber 26. The liquid that comes from the pressure liquid pump of the transmission and that is necessary for the maintenance of the pressure in the working chamber 26 and for cooling is therefore flowing from the central channel 66 through the bores 498 and 500 to the working chamber 26.

Figure 23:
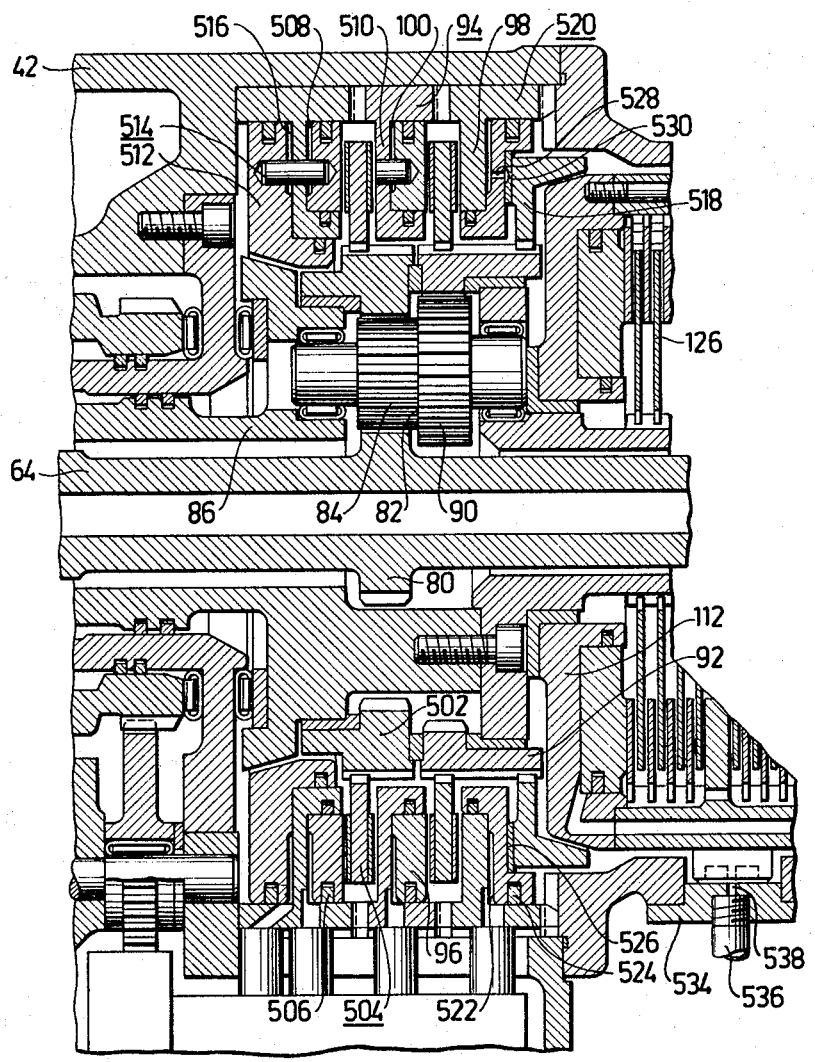
FIG. 23 shows a fraction of a longitudinal section corresponding to FIG. 1b through a fifth embodiment of the invention.
Figure 24:
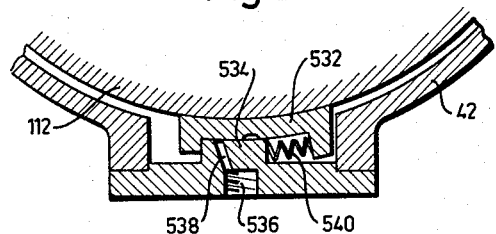
FIG. 24 shows a cross section taken on a line 24—24 of FIG. 23.
Figure 25:
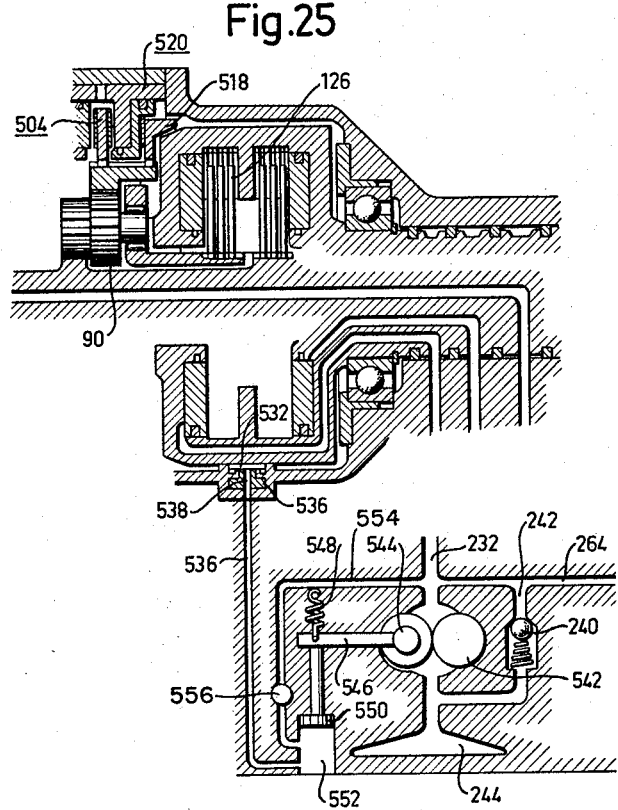
FIG. 25 shows a fraction of a control system especially adapted for the embodiment shown in FIGS. 23 and 24.

The embodiment shown in FIGS. 23-25 differs from the embodiment shown in FIGS. 1-13 in that the reverse gear is substituted by a special type of planet gear arrangement and in that the planet gear is adapted for two different speed ratios between the turbine and reaction members. Furthermore, the feeder pump arrangement is somewhat different.

In the planet gear the sun gear 80 of the turbine shaft 64 is in constant intermesh with the first rim 84 of the planets 82 mounted in the planet carrier 86 while the second rim 90 of the planets is in constant intermesh with the ring gear 92, which is anchorable to the stationary casing 42 by the brake 94 comprising the piston 96, the cylinder 100 and the stationary portion 98. The first rim 84 of the planets is further in constant intermesh with a second ring gear 502 anchorable to the stationary casing 42 by a brake 504 comprising a piston 506, a cylinder 508 and a stationary portion 510. The planet carrier 86 is further provided with a conical friction surface for cooperation with a corresponding conical surface of a piston 512 forming a portion of a brake 514 also comprising a cylinder 516. On the first ring gear 92 a clutch element 518 is nonrotatably but axially slidable mounted. This clutch element 518 is provided with a conical friction surface for cooperation with a corresponding conical surface on the propeller shaft 112. A hydraulic servo-motor 520 mounted in the stationary casing 42 and comprising a cylinder 522 and a piston 524 cooperating with a bearing surface 526 of the clutch element 518. In the piston 524 there is at least one hole 528 communicating with an annular groove 530 in the friction surface 526 in order to obtain a supply of lubricating oil to this surface.

In FIG. 24 is shown a tiltable block 532 mounted on a projection 534 of the stationary casing 42. In this projection a channel 536 having a restricted opening 538 is located. A spring 540 is provided to tilt the block 532 into such a position that the opening 538 is closed while the surface of the block 532 facing the propeller shaft 112 is designed in such a way that the block follows the surface of the shaft with only a very small clearance which means that the oil film between the shaft 112 and the block at high speeds of the shaft tries to tilt the block in the opposite direction to that in which the spring 540 is acting so that there will be an escape from the opening 538.

FIG. 25 shows a modified design of the feeder pump design where there is only one gear pump comprising a driving gear 542 and a corotating gear 544 adjustable into different positions by the lever 546. The lever 546 is actuated in one direction by a spring 548 and in the other direction by a piston 550 mounted in a cylinder 552. The cylinder 552 communicates with the high pressure side of the pump 542, 544 through a channel 554 having a restricted portion 556 and with the opening 538 through the channel 536.

The special function of the embodiment shown in FIGS. 23–25 is that when the brake 504 is engaged instead of the brake 94 there is another speed ratio between the turbine members, which not only means that the performance characteristic in relation to the speed ratio between the turbine and pump members but also that there is another speed ratio between the turbine and reaction shafts, when the clutches 106 and 126 are shifted. By engaging the brake 514 for the planet carrier still another performance characteristic in relation to the speed ratio between the turbine and pump members is obtained, which can be used when the clutch 106 is engaged. Instead of two different speed ranges in the embodiment shown in FIGS. 1–13 five different ranges can be obtained in the embodiment shown in FIGS. 23–25. If the brake 514 for the planet carrier 86 and the hydraulic servo-motor 520 are engaged simultaneously, the ring gear 92 will rotate in opposite direction to that of the turbine member and the propeller shaft 112 will rotate with the ring gear 92 by means of the clutch element 518.

The pump arrangement is such that the second pump 236, 238 is missing and all liquid is distributed from the pressure side of the pump 542, 544 through the channels 232 and 264. The capacity of the pump 542, 544 is dependent on the speed of the propeller shaft 112, as at increased speed of the shaft the drainage of the cylinder 552 through the channel 536 is increased, which means that the pressure decreases in the cylinder and the spring 548 moves the corotating gear 544 into a position, where the capacity of the pump is lower.

The present invention is of course not limited to the embodiments shown and described but comprises everything falling within the scope of the following claims.

What is claimed is:

1. Transmission, particularly intended for motor vehicles, comprising a hydrodynamic torque converter provided with a pump member, a turbine member, a reaction member and a gear device connecting the turbine and reaction members for rotation thereof in the same direction at a predetermined speed ratio therebetween, in which the turbine member and the reaction member are independently directly connectable with a propeller shaft by two separate selectively operable clutches.

2. Transmission as defined in claim 1, in which the two clutches are hydraulically operated.

3. Transmission as defined in claim 1, in which a centrifugal regulator device driven by the propeller shaft is provided to control the shifting between the two clutches.

4. Transmission as defined in claim 3, in which the centrifugal regulator is provided with two steps and with a manually operated control for overruling the centrifugal regulator in the lower step.

5. Transmission as defined in claim 4, in which the manually operated control is connected with the power control of the engine.

6. Transmission as defined in claim 3, in which a manually operated device connected with the brake system of the vehicle is provided to overrule the centrifugal regulator.

7. Transmission as defined in claim 1, in which the gear device between the turbine and reaction members is of the planet gear type.

8. Transmission as defined in claim 7, in which the turbine member is connected with a sun gear, the reaction member is connected with the planet carrier, and a ring gear is selectively anchorable to a stationary casing.

9. Transmission as defined in claim 8, in which each planet is provided with at least two different rims with different diameters, one of which is in constant intermesh with the sun gear, and each of which is in constant intermesh with one of the two ring gears selectively anchorable to the stationary casing.

10. Transmission as defined in claim 8, in which the ring gear is floatingly mounted on the planets and provided with conical friction surfaces cooperating with corresponding conical friction surfaces nonrotatably mounted in the stationary casing.

11. Transmission as defined in claim 8, in which the planet carrier is anchorable to the stationary casing.

12. Transmission as defined in claim 11, in which a clutch member is provided to connect the ring gear with the output shaft.

13. Transmission as defined in claim 12, in which an axially slidable clutch element is mounted on the ring gear.

14. Transmission as defined in claim 13, in which the clutch element is nonrotatably mounted on the ring gear and axially movable by a servo-motor.

15. Transmission as defined in claim 13, in which the clutch element is angularly adjustable between two positions and frictionally connected with the stationary casing.

16. Transmission as defined in claim 11, in which the anchoring means for the planet carrier is of the free wheel type.

17. Transmission as defined in claim 8, in which a second planet gear is provided in such a way that the reaction member is connected with a sun gear, the propeller shaft is connected with a ring gear, and the planet carrier carrying planets in constant intermesh with said sun and ring gears is selectively anchorable to the stationary casing.

18. Transmission as defined in claim 17, in which a quotient regulator driven by the pump member and the propeller shaft is provided for changing between the two planet gears.

19. Transmission as defined in claim 18, in which a manually operated control for overruling the quotient regulator is connected with the brake system of the vehicle.

20. Transmission as defined in claim 1, in which the turbine member is provided with two blade rings and the reaction member is provided with one blade ring located between the two turbine blade rings.

21. Transmission as defined in claim 20, in which the reaction blade ring is located in a portion of the working chamber, in which the flow of the liquid is directed substantially radially inwardly and the inlet edges of the reaction blades are located radially the radially outermost portion of the core of the working chamber.

22. Transmission as defined in claim 1, in which the turbine member is provided with one blade ring and the reaction member is provided with one blade ring located in the direction of the flow of the liquid between the turbine blade ring and a pump blade ring.

23. Transmission as defined in claim 1, in which a feeder pump driven by the pump member is provided for variation of the displacement volume.

24. Transmission as defined in claim 23, in which the displacement pump is designed as a gear pump, a driving gear and a corotating gear carried in bearings by an eccentric race of an angularly adjustable shaft.

25. Transmission as defined in claim 24, in which the angularly adjustable shaft is provided with an operation lever cooperating with a spring acting in a direction to adjust the corotating gear to a position for maximum displacement volume.

26. Transmission as defined in claim 25, in which the operation lever cooperates with a selectively engageable electric solenoid acting in a direction to adjust the corotating gear to a position for minimum displacement volume.

27. Transmission as defined in claim 25, in which the operation lever cooperates with a hydraulic servo-motor with variable pressure.

28. Transmission as defined in claim 27, in which the pressure liquid to the servo-motor is delivered from the high pressure side of the displacement pump through a throttling opening and the liquid is directed from the servo-motor through a variable valve operated in dependence on the speed of the propeller shaft.

29. Transmission as defined in claim 28, in which the variable valve comprises a valve body tiltably mounted and influenced in one direction of a spring and in the other direction of the oil film surrounding the propeller shaft.

30. Transmission as defined in claim 23, in which a second displacement pump is located in series with the first pump, which second pump has a small capacity in relation to the maximum capacity of the first pump.

31. Transmission as defined in claim 30, in which a valve is provided in parallel to the second pump for flow of liquid from the high pressure side of the first pump to the high pressure side of the second pump, whereby the servo-motors of the transmission will be filled by the first pump and the operation pressure will be delivered by the second pump.

References Cited
UNITED STATES PATENTS

| | | | |
|---|---|---|---|
| 2,905,025 | 9/1959 | Karlsson | 74—677 |
| 3,110,197 | 11/1963 | Prakash | 74—677 |

ROBERT M. WALKER, *Primary Examiner.*

LAURENCE V. EFNER, *Examiner.*

W. J. GOODLIN, *Assistant Examiner.*